(12) United States Patent
Kawanishi

(10) Patent No.: US 11,029,900 B2
(45) Date of Patent: Jun. 8, 2021

(54) PRINTING APPARATUS, CONTROL METHOD, AND STORAGE MEDIUM

(71) Applicant: CANON KABUSHIKI KAISHA, Tokyo (JP)

(72) Inventor: Masaki Kawanishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/789,596

(22) Filed: Feb. 13, 2020

(65) Prior Publication Data

US 2020/0272387 A1 Aug. 27, 2020

(30) Foreign Application Priority Data

Feb. 27, 2019 (JP) .............................. JP2019-034740

(51) Int. Cl.
*G06F 3/12* (2006.01)
*B33Y 50/00* (2015.01)
*B29C 64/386* (2017.01)

(52) U.S. Cl.
CPC .......... *G06F 3/1255* (2013.01); *B29C 64/386* (2017.08); *B33Y 50/00* (2014.12); *G06F 3/1205* (2013.01)

(58) Field of Classification Search
CPC ..... G06F 3/1255; G06F 3/1205; B33Y 50/00; B29C 64/386
USPC ....................................................... 358/1.15
See application file for complete search history.

(56) References Cited

U.S. PATENT DOCUMENTS

| | | | | |
|---|---|---|---|---|
| 2007/0046973 A1* | 3/2007 | Toda | ..................... | G06F 3/1288 358/1.13 |
| 2008/0043284 A1* | 2/2008 | Tokishige | ............. | G06F 3/1254 358/1.15 |
| 2008/0170262 A1* | 7/2008 | Takahashi | .......... | H04N 1/00411 358/1.15 |
| 2010/0315674 A1* | 12/2010 | Shimizu | ................ | G06F 3/1258 358/1.15 |
| 2012/0081364 A1* | 4/2012 | Yamaji | .................... | G06T 15/00 345/419 |
| 2016/0077777 A1* | 3/2016 | Kobayashi | ............ | G06F 3/1254 358/1.15 |
| 2018/0349068 A1* | 12/2018 | Ozawa | ................... | G06F 3/1238 |
| 2019/0163420 A1* | 5/2019 | Taima | ................... | G06F 21/608 |

FOREIGN PATENT DOCUMENTS

JP         2009-110080 A      5/2009

* cited by examiner

*Primary Examiner* — Allen H Nguyen
(74) *Attorney, Agent, or Firm* — Venable LLP

(57) ABSTRACT

A printing apparatus includes one or more memories, and one or more processors that execute a set of instructions to receive a print job including at least print settings from an external apparatus, store a plurality of received print jobs in a storage device, receive selection of a stored print job as a target of printing from a user, and receive a change of a print setting of the selected print job from a user. When selection of a plurality of stored print jobs is received, and if at least one of the plurality of selected print jobs includes a print setting that is forbidden to be changed when the plurality of print jobs are stored in the storage device, a display is controlled to indicate not to change a value of the print setting.

11 Claims, 23 Drawing Sheets

FIG. 9

| TIME AND DATE | USER NAME | STORAGE LOCATION | PRINT JOB NAME | PRINT SETTING ||||| 
|---|---|---|---|---|---|---|---|
| | | | | NUMBER OF COPIES | COLOR SELECTION | DOUBLE-SIDED PRINT | PAGE AGGREGATION | BOOKBINDING |
| 2017/11/10 10:34:45 | User1 | /data/User1/doc1 | AAA.doc | 1 COPY | AUTOMATIC | NOT SET | 1 in 1 | NOT SET |
| 2017/11/10 13:50:22 | User1 | /data/User1/doc2 | BBB.pdf | 1 COPY | AUTOMATIC | SET | 1 in 1 | SET |
| 2017/11/10 14:10:00 | User2 | /data/User2/doc1 | CCC.doc | 2 COPIES | AUTOMATIC | NOT SET | 1 in 1 | NOT SET |
| 2017/11/10 14:12:00 | User2 | /data/User2/doc2 | DDD.doc | 5 COPIES | MONOCHROME | NOT SET | 2 in 1 | NOT SET |

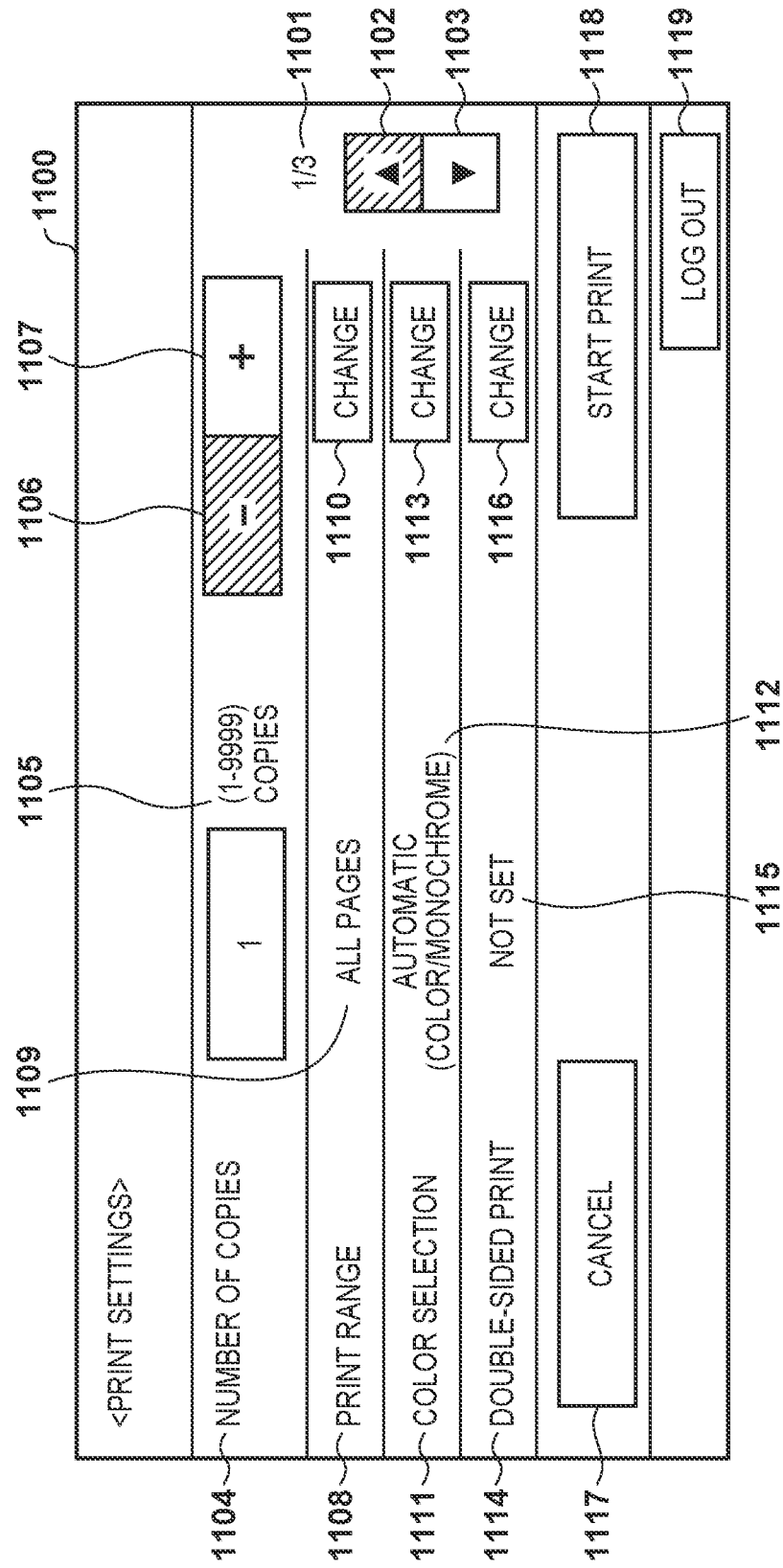

FIG. 12A

<(COLLECTIVE) PRINT SETTINGS> — 1200

- 1201 — NUMBER OF SELECTED JOBS:2
- 1202 — ☐ CHANGE NUMBER OF COPIES
- 1203 — ☐ CHANGE TO MONOCHROME
- 1204 — ☐ PERFORM DOUBLE-SIDED PRINT
- 1205 — ☐ PERFORM PAGE AGGREGATION
- 1206 — [ CANCEL ]
- 1207 — [ START PRINT ]
- 1208 — [ LOG OUT ]

FIG. 12B

<(COLLECTIVE) PRINT SETTINGS> — 1220

- 1221 — NUMBER OF SELECTED JOBS:2
- 1222 — ▨ CHANGE NUMBER OF COPIES  [ 1 ]  (1-9999) COPIES — 1223   [ − ] 1224   [ + ] 1225
- 1226 — ▨ CHANGE TO MONOCHROME    MONOCHROME — 1227
- 1228 — ▨ PERFORM DOUBLE-SIDED PRINT   LONG-SIDE BINDING — 1229   [ CHANGE ] — 1230
- 1231 — ▨ PERFORM PAGE AGGREGATION   2 in 1 — 1232   [ CHANGE ] — 1233
- 1234 — [ CANCEL ]
- 1235 — [ START PRINT ]
- 1236 — [ LOG OUT ]

F I G. 15A

| Determination Condition | Is determination needed? | | | | | | |
|---|---|---|---|---|---|---|---|
| | NUMBER OF COPIES | PRINT RANGE | COLOR SELECTION | CHANGE TO MONOCHROME | DOUBLE-SIDED PRINT | PAGE AGGREGATION |
| HAS PRINT JOB UNDERGONE BOOKBINDING IMPOSITION? | NOT NECESSARY | NECESSARY | NOT NECESSARY | NOT NECESSARY | NECESSARY | NECESSARY |
| HAS DEVICE BOOKBINDING BEEN SET ON PRINT JOB? | NOT NECESSARY | NECESSARY | NOT NECESSARY | NOT NECESSARY | NECESSARY | NOT NECESSARY |
| HAS LAYOUT OTHER THAN 1-in-1 LAYOUT BEEN SET ON PRINT JOB? | NOT NECESSARY | NECESSARY | NOT NECESSARY | NOT NECESSARY | NOT NECESSARY | NECESSARY |
| IS PRINT JOB MONOCHROME DATA? | NOT NECESSARY | NOT NECESSARY | NECESSARY | NOT NECESSARY | NOT NECESSARY | NOT NECESSARY |
| HAS DEVICE COMBINATION BEEN SET ON PRINT JOB? | NOT NECESSARY | NOT NECESSARY | NOT NECESSARY | NOT NECESSARY | NOT NECESSARY | NECESSARY |
| IS PDL TYPE OF PRINT JOB JPEG? | NOT NECESSARY | NOT NECESSARY | NOT NECESSARY | NOT NECESSARY | NOT NECESSARY | NECESSARY |
| IS PDL TYPE OF PRINT JOB PS? | NOT NECESSARY | NOT NECESSARY | NOT NECESSARY | NOT NECESSARY | NOT NECESSARY | NECESSARY |
| IS PRINT RANGE OF PRINT JOB OTHER THAN ALL PAGES? | NOT NECESSARY | NOT NECESSARY | NECESSARY | NOT NECESSARY | NOT NECESSARY | NECESSARY |
| IS DEVICE COPY-FORGERY-INHIBITED PATTERN SET ON DEVICE? | NOT NECESSARY | NOT NECESSARY | NECESSARY | NOT NECESSARY | NOT NECESSARY | NECESSARY |
| DOES DEVICE HAVE DOUBLE-SIDED CAPABILITY? | NOT NECESSARY | NOT NECESSARY | NOT NECESSARY | NOT NECESSARY | NECESSARY | NOT NECESSARY |
| DOES DEVICE HAVE COLOR PRINTING CAPABILITY? | NOT NECESSARY | NOT NECESSARY | NECESSARY | NECESSARY | NOT NECESSARY | NECESSARY |

FIG. 15B

| 1501 | DETERMINATION RESULT WHEN DETERMINATION IS NEEDED 1504 | |
|---|---|---|
| | POSSIBLE TO CHANGE SETTING | IMPOSSIBLE TO CHANGE SETTING |
| 1505 | NO BOOKBINDING IMPOSITION | UNDERWENT BOOKBINDING IMPOSITION |
| 1506 | NO SETTING OF DEVICE BOOKBINDING | SETTING OF DEVICE BOOKBINDING |
| 1507 | PRINT JOB IS 1 in 1 | PRINT JOB IS OTHER THAN 1 in 1 |
| 1508 | OTHER THAN MONOCHROME DATA | MONOCHROME DATA |
| 1509 | NO SETTING OF DEVICE COMBINATION | SETTING OF DEVICE COMBINATION |
| 1510 | PDL TYPE IS OTHER THAN JPEG | PDL TYPE IS JPEG |
| 1511 | PDL TYPE IS OTHER THAN PS | PDL TYPE IS PS |
| 1512 | PRINT RANGE IS ALL PAGES | PRINT RANGE IS OTHER THAN ALL PAGES |
| 1513 | NO SETTING OF DEVICE COPY-FORGERY-INHIBITED PATTERN | SETTING OF DEVICE COPY-FORGERY-INHIBITED PATTERN |
| 1514 | CAPABILITY OF DOUBLE-SIDED | NO CAPABILITY OF DOUBLE-SIDED |
| 1515 | CAPABILITY OF COLOR PRINTING | NO CAPABILITY OF COLOR PRINTING |

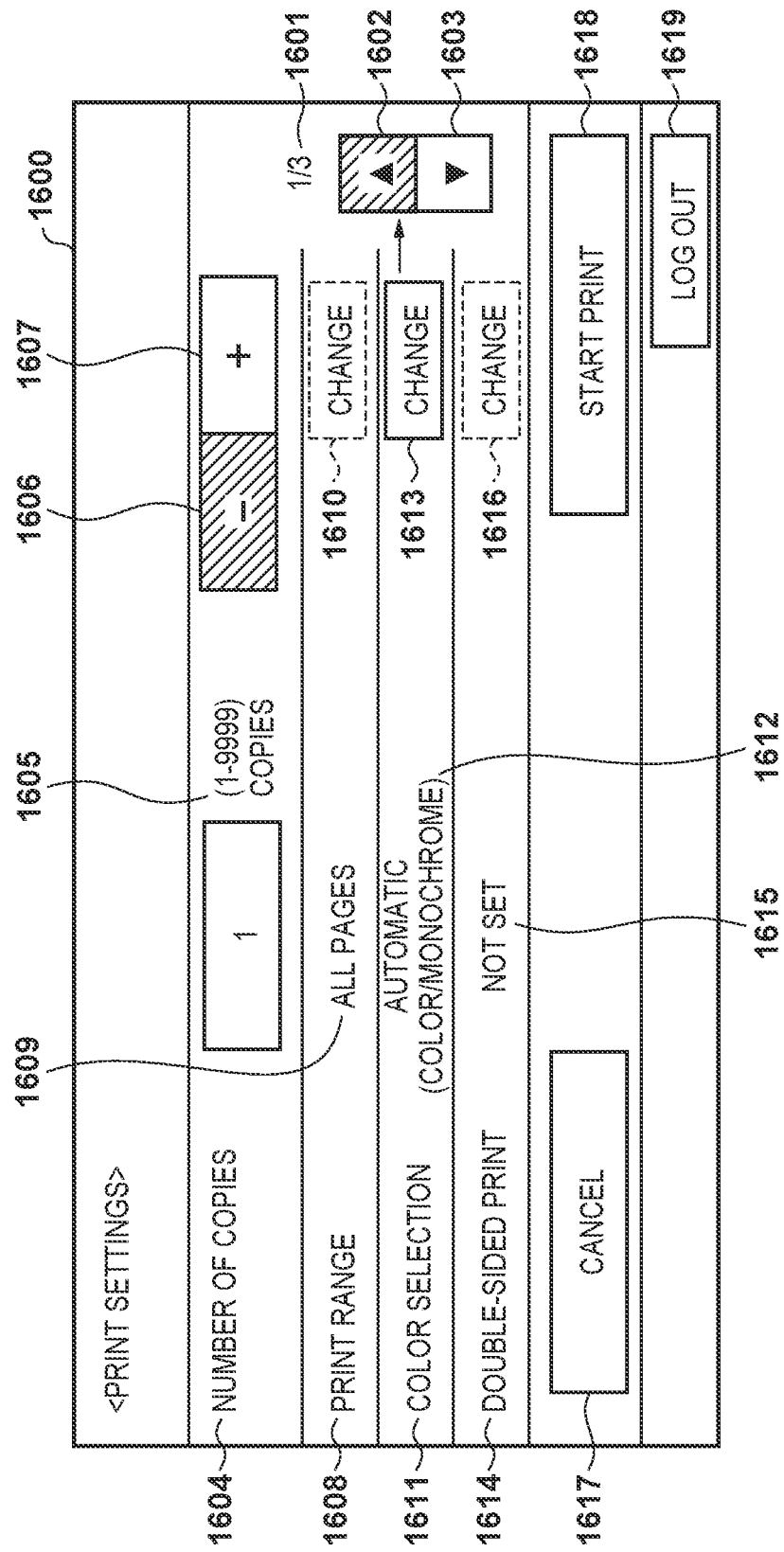

PRINTING APPARATUS, CONTROL METHOD, AND STORAGE MEDIUM

BACKGROUND OF THE INVENTION

Field of the Invention

The present disclosure relates to a printing apparatus, a control method, and a storage medium for collectively changing the print settings of a plurality of print jobs held in an image forming apparatus.

Description of the Related Art

There are image forming apparatuses that have, for the purpose of security, a hold printing function, in which a print job submitted from a printer driver is temporarily held in a hard disk in an image forming apparatus, and the stored print job is output after the user is authenticated using an operation unit of the image forming apparatus. In hold printing, after authentication in the image forming apparatus, the user selects a print job that they desire to print, from a print job list displayed on the operation unit, and gives a print instruction. It is also possible to change the print settings before giving a print instruction, apply the changed print settings, and perform printing.

Japanese Patent Laid-Open No. 2009-110080 discloses a program for collectively changing the print settings of a plurality of print files spooled in a spooler. According to this disclosure, a printer server accumulates print files in the spooler. It is possible to select a plurality of print files spooled in the spooler, and collectively change the print settings, by operating a printer driver of a client computer.

However, in Japanese Patent Laid-Open No. 2009-110080, consideration is not given to a case where spooled print files include a print file to which a setting change cannot be applied or a print file for which a setting change is not desirable. For example, there are cases where print settings set when a print file is spooled and print settings set during a setting change cannot be performed at the same time. Such settings are called exclusive settings. In a specific example, regardless of print settings for bookbinding printing being set when a print file is spooled, setting of double-sided print can be changed to single-sided print during a setting change. In bookbinding printing, the order of pages of a print file is rearranged, double-sided printing is performed, and the paper is folded in half, and thereby a form of a book can be achieved. Therefore, bookbinding printing and a setting change to single-sided printing cannot be achieved at the same time. As another example, there are cases where a function that an image forming apparatus does not have is specified during a setting change. In a specific example, an image forming apparatus does not have a function of double-sided printing while double-sided printing can be set during a setting change. However, since the image forming apparatus does not have a function of double-sided printing, double-sided printing cannot be performed. As yet another example, there are cases where print settings are limited in an image forming apparatus while a setting change to a print setting that is prohibited is made during a setting change. There are cases where limitation of print settings is set for each user. In a specific example, a user is prohibited from double-sided printing while double-sided printing can be set during a setting change. Since the user is prohibited from double-sided printing, they cannot perform double-sided printing.

As described above, there have been cases where, when collectively changing the settings of a plurality of print jobs held in an image forming apparatus, a setting change that is not to be permitted essentially is permitted.

SUMMARY OF THE INVENTION

According to an aspect of the present invention, there is provided a printing apparatus comprising: an operation device; one or more memories; and one or more processors that execute a set of instructions to: receive a print job from an external apparatus, store the received print job, receive selection of the stored print job from a user through the operation device, receive a change of a print setting of the selected print job from a user through the operation device, and execute the selected print job, wherein, when selection of a plurality of stored print jobs is received, and if at least one of the plurality of selected print jobs includes an item of a print setting that is not allowed to be changed, display is performed on the operation device so as not to receive a change in a print setting related to the item.

According to the present invention, when selection of a plurality of stored print jobs is received, and if at least one of the plurality of selected print jobs includes an item of a print setting that is not to be changed, the printing apparatus performs display so as to prevent a change in a print setting for the item from being received, on the operation device.

Further features of the present invention will become apparent from the following description of exemplary embodiments with reference to the attached drawings.

BRIEF DESCRIPTION OF THE DRAWINGS

FIG. 9 is a diagram showing an example of a bibliographic information list.

FIGS. 11A to 11C are diagrams showing an example of a print setting screen.

FIGS. 12A and 12B are diagrams showing an example of a (collective) print setting screen.

FIGS. 15A and 15B show a change determination list.

FIG. 16 is a diagram showing a print setting screen.

DESCRIPTION OF THE EMBODIMENTS

Figure 1:
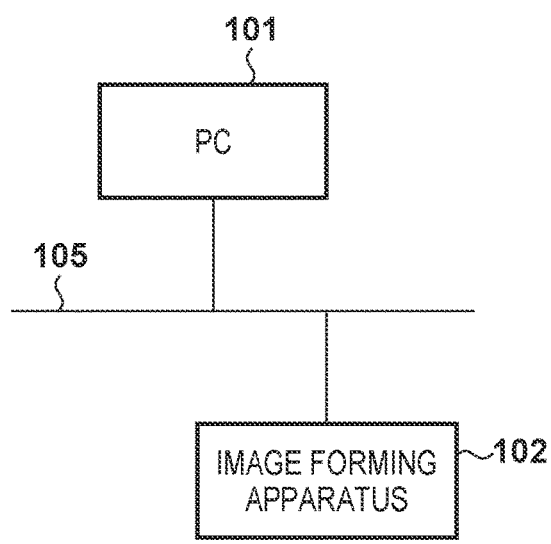
FIG. 1 is a diagram showing an example of a network configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

In this embodiment, an example will be described in which a print job is submitted from a PC 101 to an image forming apparatus 102. The image forming apparatus 102 temporally withholds/stores a print job submitted from an external apparatus such as the PC 101, in a hard disk drive (HDD) 205 or the like provided in the image forming apparatus 102, instead of immediately printing the print job. The user then selects a plurality of print jobs held in the image forming apparatus 102 by performing an operation on an operation unit (or operation device) 207 or the like of the image forming apparatus 102, changes a print setting, and performs printing. At this time, only by the user performing one operation of changing a print setting, the change in the print setting is collectively applied to the plurality of selected print jobs, and it is possible to easily change the print setting and perform printing. Note that there are cases where the plurality of selected print jobs include a print job to which a print setting change made by the user cannot be applied. In that case, control is performed so as to prevent the user from carrying out an operation of changing a print setting that cannot be applied. With such a configuration, the user does not make an incorrect change in the print setting, and thus it is possible to provide the image forming apparatus 102 that is excellent in usability. Note that withholding of a print job is usually protected using an authentication code (for example, password) in order to prevent any user other than the authorized user from executing (in other words, print-outputting) the print job. Therefore, hold printing may be called "secure print", and a print job of hold printing may be called "secure print job" or "secure job". In this embodiment, secure print and hold printing refer to the same processing.

Configuration of Image Forming System

FIG. 1 is a diagram showing an example of a network configuration of an image forming system according to the present embodiment. The personal computer (PC) 101 that is an information processing apparatus that submits a print job and the image forming apparatus 102 that processes the submitted print job are connected to a LAN 105. The image forming apparatus 102 is an example of a printing control apparatus. The number of PCs and the number of image forming apparatuses that are connected are not limited thereto. The image forming apparatus 102 manages bibliographic information for uniquely specifying a print job submitted from the PC 101. Note that, in this embodiment, an apparatus from which a print job is submitted is the PC 101, but a device other than a PC (for example, a mobile terminal or another image forming apparatus) may also be adopted.

When the user performs user authentication in the image forming apparatus 102, and logs in, the image forming apparatus 102 obtains and displays a list of print jobs that the log-in user can print. A user interface on which the list is displayed functions as a reception unit that receives a selection operation performed by the user, and, when the user selects a desired print job from the list, the image forming apparatus 102 obtains printing data of the selected print job and prints the data.

Configuration of Image Forming Apparatus

Figure 2:
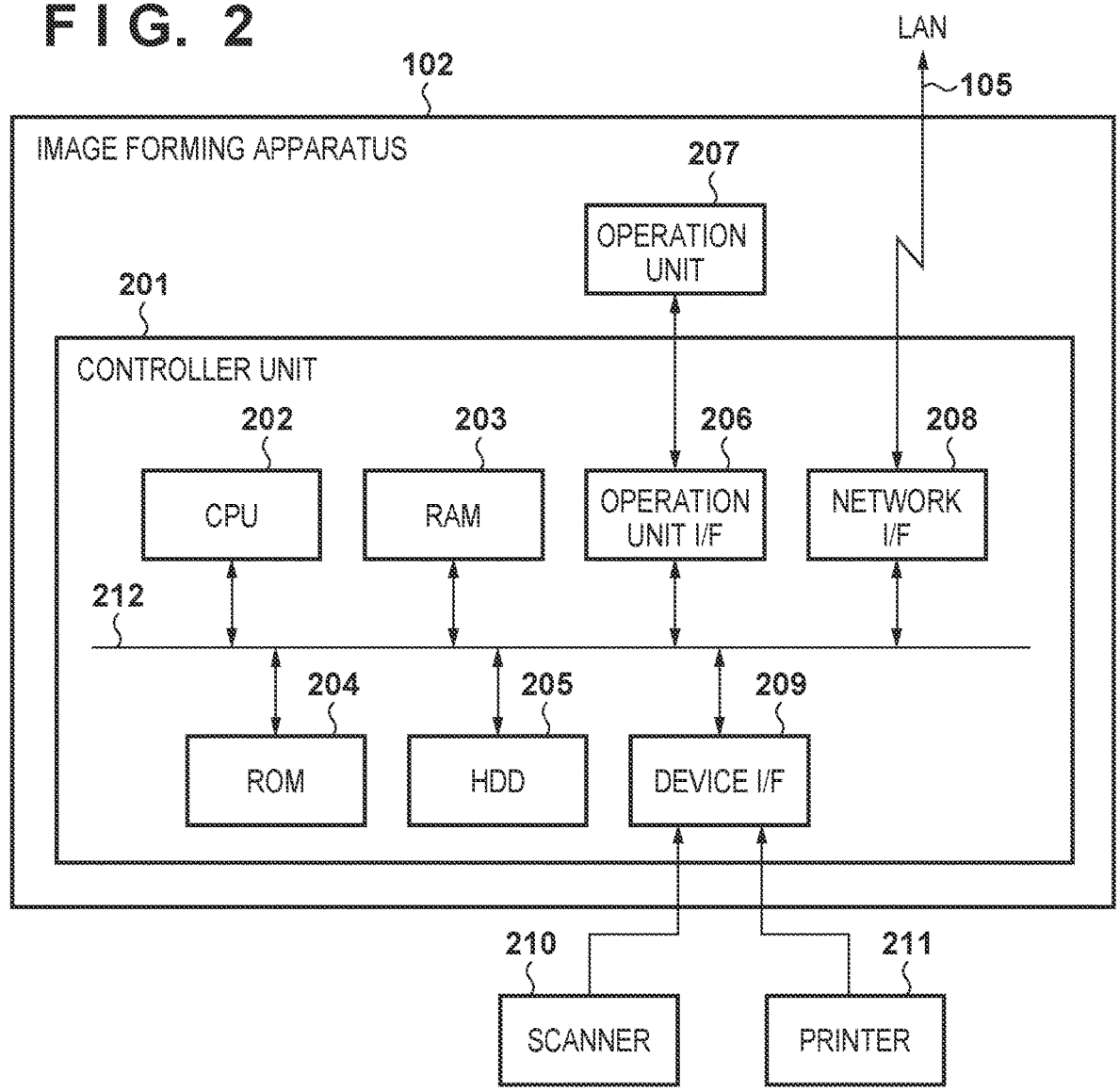
FIG. 2 is a block diagram showing an overall configuration of an image forming apparatus 102.

FIG. 2 is a block diagram showing an overall configuration of the image forming apparatus 102. The image forming apparatus 102 is a device that has an image forming function, and, for example, may also be a multi-function copier or a multi-function device called a multi-function peripheral device or the like, but may also be a single-function printer that has a print function only. In a controller unit 201 in the image forming apparatus 102, a CPU 202 is a computation device that performs overall control of the system. A RAM 203 is a system work memory for the CPU 202 to operate, and is an image memory that temporarily stores image data. The RAM 203 also stores data and programs such as an operating system, system software, and application software. A ROM 204 stores a system boot program. The hard disk drive (HDD) 205 stores an operating system, system software, application software, image data, setting data, and the like. The HDD 205 also functions as a storage unit that stores print jobs that are saved. An operation unit I/F 206 is an interface unit connected to the operation unit 207, and outputs information to be displayed on the operation unit 207, to the operation unit 207. The operation unit I/F 206 also receives information input by the user using the operation unit 207. A network I/F 208 is connected to the network (LAN) 105, and inputs information to or receives information from a PC or another image forming apparatus connected to the same LAN. A device I/F 209 connects a scanner 210 that is an image input/output device, a printer 211, and the controller unit 201, and inputs/receives image data to/from such devices. The above-mentioned devices are arranged on a system bus 212.

Figure 3:
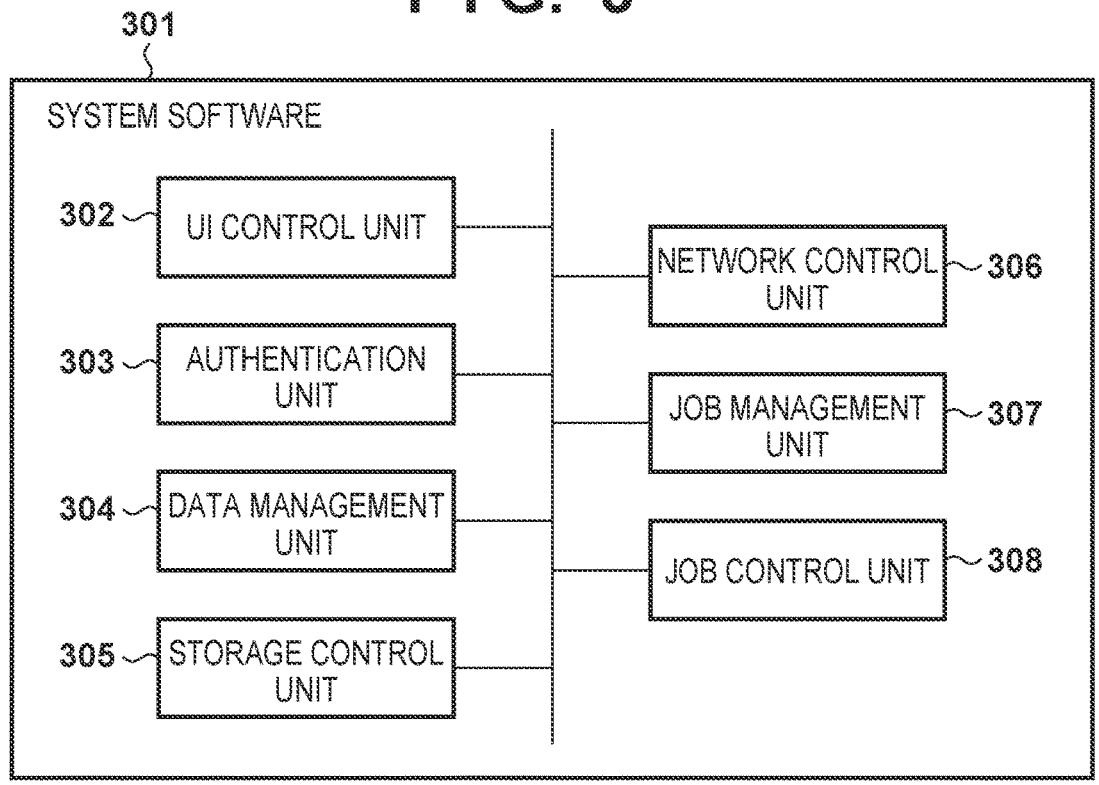
FIG. 3 is a block diagram showing a functional configuration of system software of the image forming apparatus 102.

FIG. 3 is a block diagram showing a functional configuration of system software of the image forming apparatus 102. System software 301 is stored in storage means such as the RAM 203, the ROM 204, or the HDD 205, and is executed by the CPU 202.

A UI control unit 302 is a display control unit for displaying a user interface screen on a display screen of the operation unit 207. Also, the UI control unit 302 receives information input by the user using the operation unit 207, via the operation unit I/F 206, and transmits the information to an authentication unit 303, a data management unit 304, and a job management unit 307. Alternatively, the UI control unit 302 receives responses from the authentication unit 303, the data management unit 304, and the job management unit 307, and outputs the information to the operation unit 207 via the operation unit I/F 206.

The authentication unit 303 performs user authentication processing based on authentication information received from the UI control unit 302, and returns the result of the processing.

The data management unit 304 receives a data writing/readout request from the UI control unit 302, a network control unit 306, and the job management unit 307, and transmits the data writing/readout request to a storage control unit 305. Alternatively, the data management unit 304 receives a response from the storage control unit 305, and transmits the information to the UI control unit 302, the network control unit 306, and the job management unit 307.

The storage control unit 305 receives a data writing/readout request from the data management unit 304, writes/reads out data to/from the HDD 205, and returns the result to the data management unit 304.

The network control unit 306 receives a request from the PC 101 or any image forming apparatus connected to the LAN 105 via the network I/F 208. The network control unit 306 then requests the data management unit 304 and the job management unit 307 to perform processing according to the received request. Alternatively, the network control unit 306 receives a response from the data management unit 304 and the job management unit 307. The network control unit 306 then transmits the received response to the PC 101 or any image forming apparatus connected to the LAN 105 via the network I/F 208.

The job management unit 307 receives a job execution request from the UI control unit 302 or the network control unit 306, and manages jobs. The job management unit 307 also requests a job control unit 308 to execute a job. Alternatively, the job management unit 307 transmits a data writing/readout request to the data management unit 304. Alternatively, the job management unit 307 receives a response from the data management unit 304 or the job control unit 308, and transmits the status of the job to the UI control unit 302 and the network control unit 306. Print jobs stored in the image forming apparatus 102 are managed by the job management unit 307, for example. The job management unit 307 can identify a stored print job according to a print job selecting operation input from the operation unit 207, for example, and change a print setting according to an operation made by the user.

The job control unit 308 receives a job execution request from the job management unit 307, and controls operations of the scanner 210 and the printer 211 via the device I/F 209. Alternatively, the job control unit 308 receives the operation states of the scanner 210 and the printer 211 via the device I/F 209, and transmits the operation states to the job management unit 307. The printer 211 prints an image onto a sheet such as paper based on a print job. The printing method may be electrophotographic or inkjet.

Configuration of Personal Computer (PC)

Figure 4:
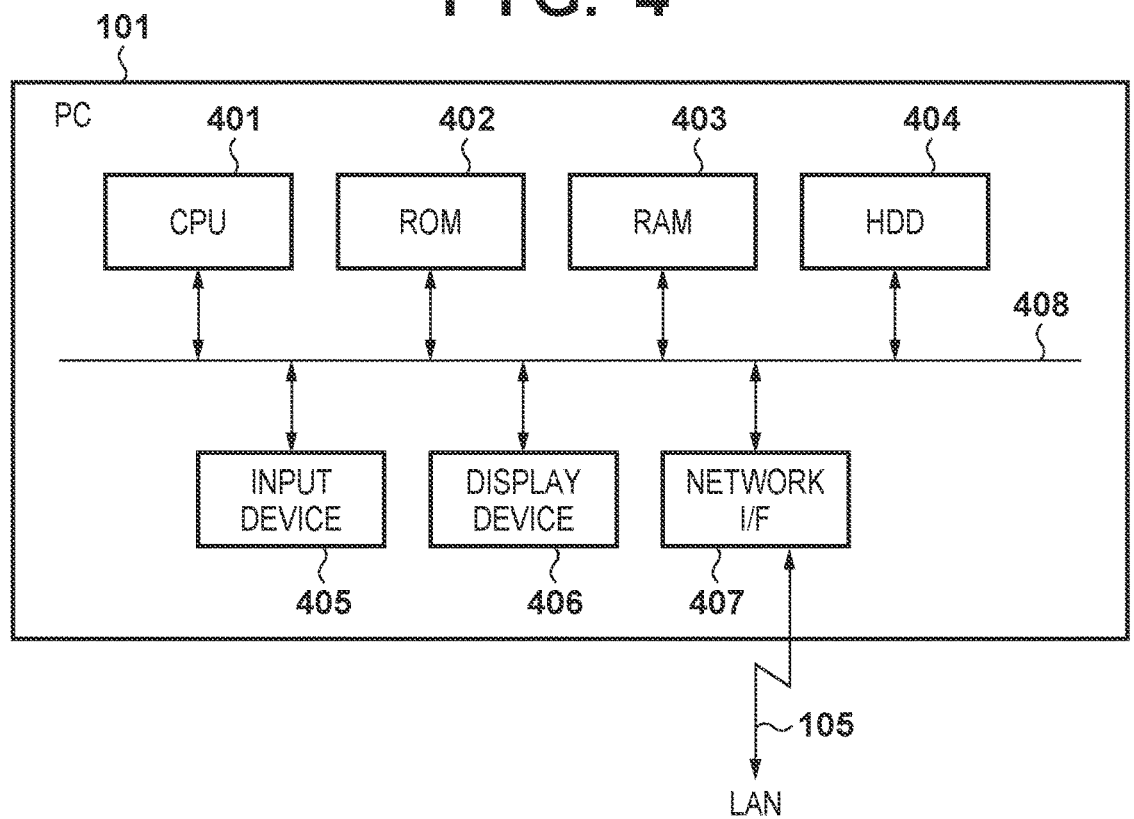
FIG. 4 is a block diagram showing an overall configuration of a PC 101.

FIG. 4 is a block diagram showing an overall configuration of the PC 101. In the PC 101, a CPU 401 is a computation device that performs overall control of the system. A ROM 402 stores programs and data related to processes. A RAM 403 is a system work memory for the CPU 401 to operate, and is a storage memory for storing temporary data related to processes. A hard disk drive (HDD) 404 stores programs and data related to processes, temporary data, application data, and the like. An input device 405 is a keyboard or a pointing device that receives instructions input to the PC 101. A display device 406 displays the operation status of the PC 101 and information output by programs that operate on the PC 101. A network I/F 407 is connected to the network (LAN) 105, and inputs/receives information to/from another PC and image forming apparatus connected to the same LAN. The above-mentioned constituent elements are arranged on a system bus 408.

Note that, as a result of the CPU 401 executing processing based on programs corresponding to the operating system (OS), the printer driver, and applications stored in the HDD 404, functions (or processes) of the OS and the printer driver are realized.

Figure 5:
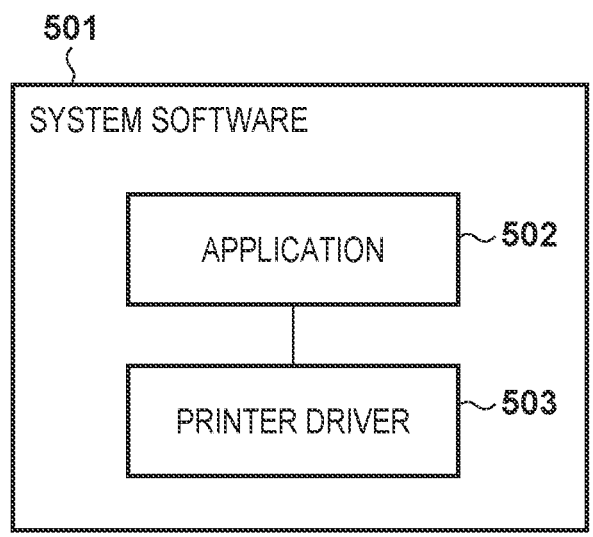
FIG. 5 is a block diagram showing a configuration of system software of the PC 101.

FIG. 5 is a block diagram showing a configuration of system software of the PC 101. System software 501 is stored in storage means, namely one of the ROM 402, the RAM 403, and the HDD 404, and is executed by the CPU 401.

The system software 501 includes an application 502 and a printer driver 503. The application 502 is a tool for generating and editing images and documents using the input device 405 such as a pointing device and a keyboard, while the display device 406 of the PC 101 is viewed, for example. The user generates data such as images and documents using the application 502, generates printing instruction data using the printer driver 503, and transmits the data to an apparatus that can perform printing such as the image forming apparatus 102. Note that the system software 501 additionally includes an operating system for managing resources of the PC 101, and the application 502 is executed under the operating system.

Processing for Entering Print Job

Figure 6:
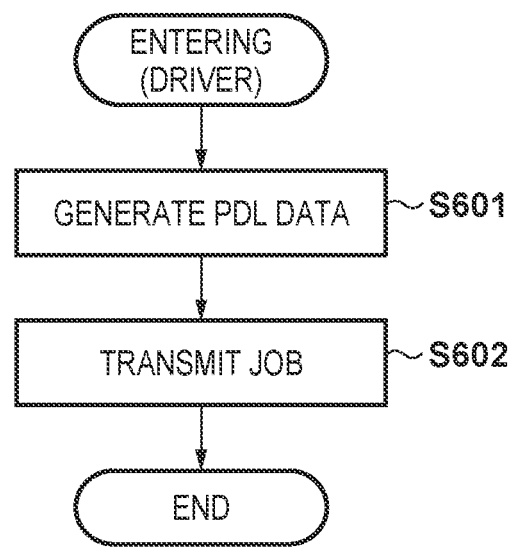
FIG. 6 is a flowchart illustrating processing for submitting a print job.

Here, processing for entering a print job will be described in which the user operates the PC 101, and inputs a print job to the image forming apparatus 102. FIG. 6 is a flowchart illustrating processing for inputting a print job that is executed by the CPU 401 of the PC 101. While viewing the display device 406, the user generates data such as images and documents on the application 502, using the input device 405 such as a pointing device or a keyboard, and gives a printing instruction. At this time, the user can specify a printing method. Examples of the printing method include normal printing, hold printing (secure print or secure printing), and the image forming apparatus 102 storing data, and the user can select a desired printing method from such examples. If secure print is selected as the printing method, the user designates a password along with the printing method. The application 502 calls a print function provided by the operating system according to a print instruction given by the user. In order to realize a print function that uses the image forming apparatus 102, the operating system calls the printer driver 503 corresponding to the image forming apparatus 102. The printer driver 503 generates PDL data in accordance with data such as images and documents, document attributes such as a document name, and print setting information that was set in the printer driver 503 when the print instruction was given (step S601). When performing secure print, a password included in the print setting information is added to the PDL data. The PDL data is then transmitted as a print job to the image forming apparatus 102 (step S602).

Processing for Storing Print Job

Figure 7:
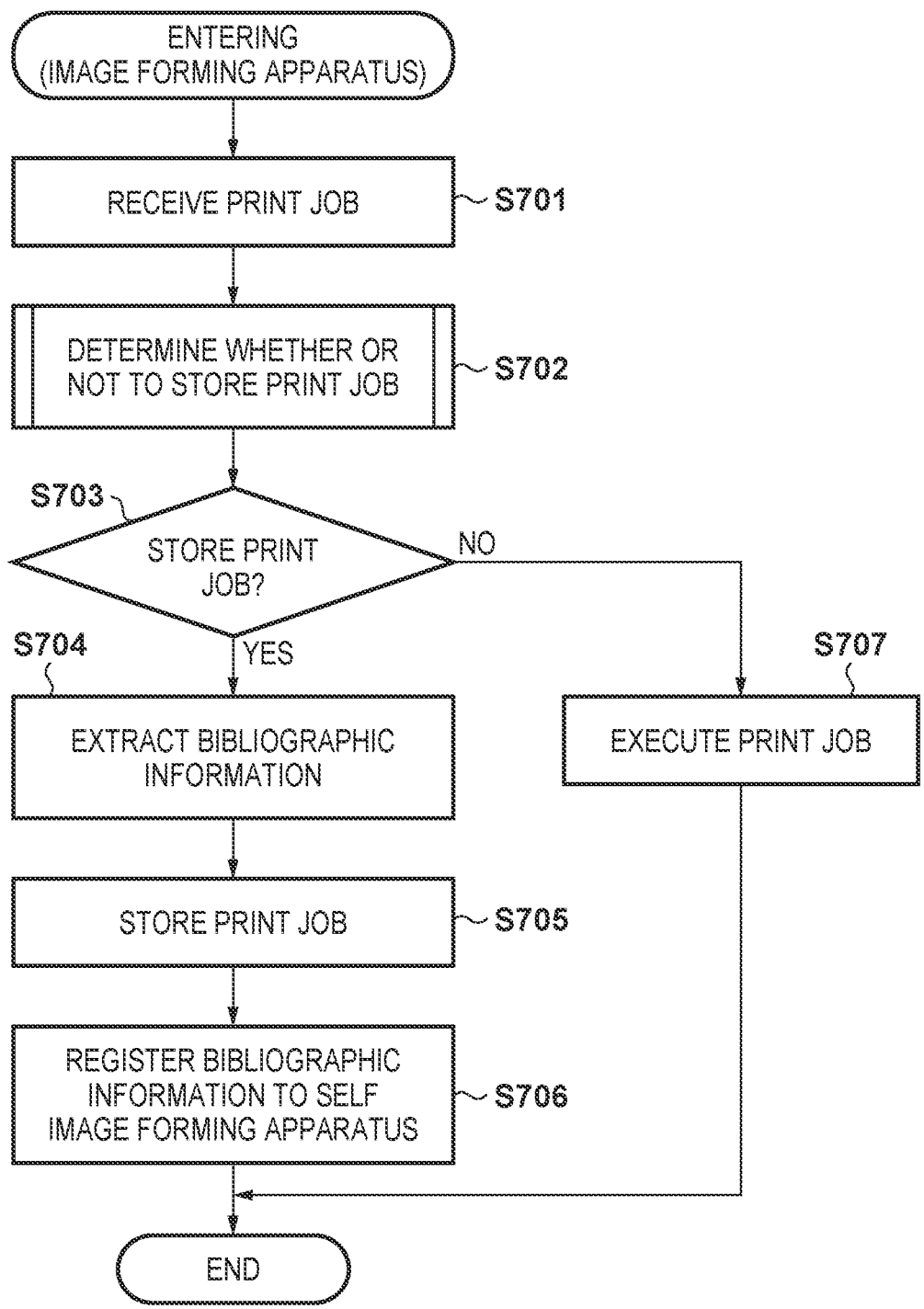
FIG. 7 is a flowchart illustrating processing for storing a print job.

FIG. 7 is a flowchart illustrating processing for storing a print job, in the system software 301, which is executed by the CPU 202 of the image forming apparatus 102. Targets for the storing processing include a secure print job when secure print is selected as a printing method and a print job to be stored, which has been selected as being to be stored.

Upon receiving a print job from the PC 101 (step S701), the network control unit 306 transmits the print job to the job management unit 307. Upon receiving the print job, the job management unit 307 determines whether or not to store the print job (step S702). Step S702 will be described later in detail with reference to FIG. 8. The job management unit 307 determines whether or not to store the print job as a result of step S702 (step S703). If the print job is not to be stored, the job management unit 307 requests the job control unit 308 to execute the print job (step S707), and the job control unit 308 executes printing. In principle, print jobs are executed in the order in which the print jobs were input in the job queue. When storing print jobs, the job management unit 307 transmits the print jobs to the data management unit 304. The data management unit 304 analyzes the print jobs received from the job management unit 307, and extracts bibliographic information (step S704). Bibliographic information will be described later. The data management unit 304 then transmits the print job and the extracted bibliographic information to the storage control unit 305. The storage control unit 305 stores the received print job and extracted bibliographic information to the HDD 205 (steps S705 and S706).

Figure 8:
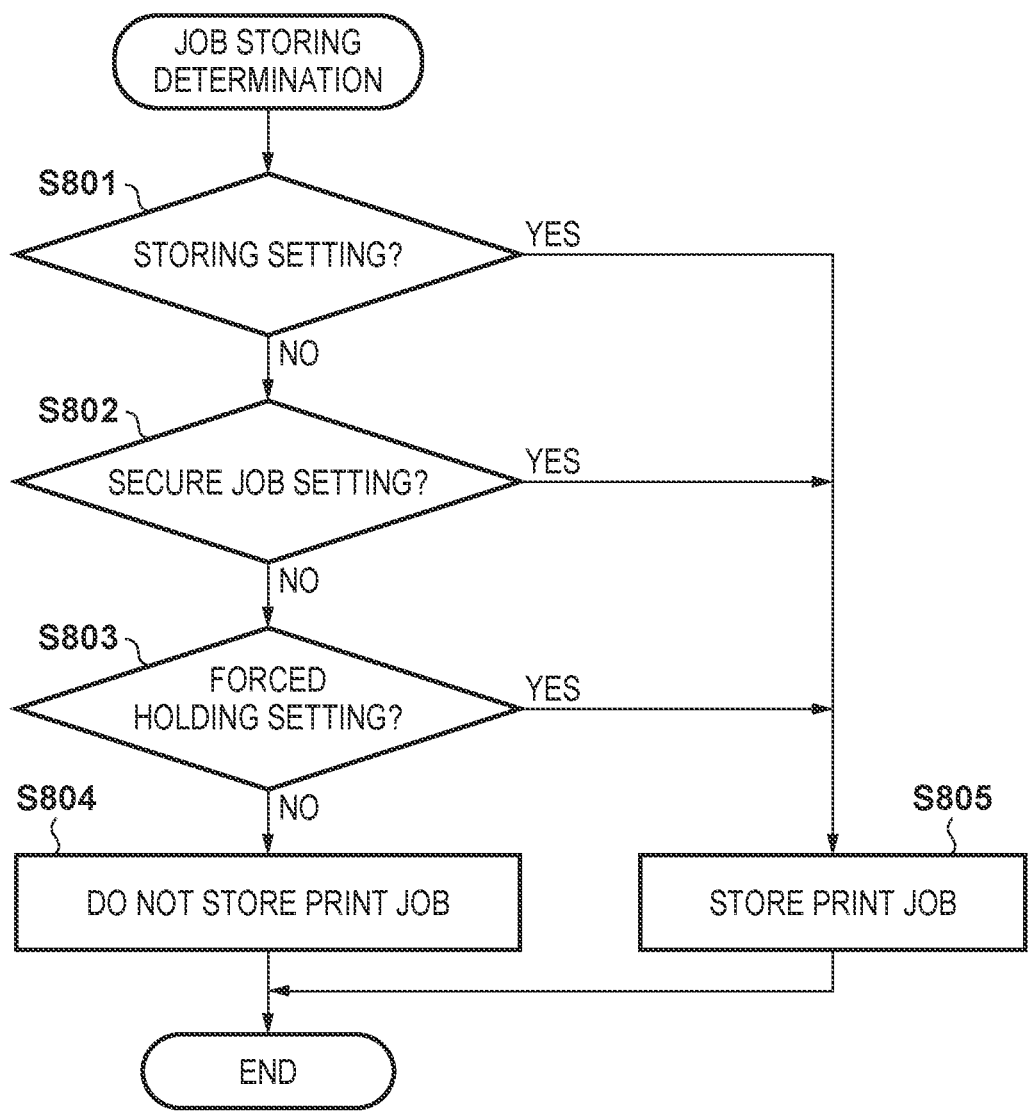
FIG. 8 is a flowchart illustrating determination as to whether or not to store a print job.

FIG. 8 is a flowchart illustrating determination in step S702 as to whether or not to store a print job, in the system software 301, which is executed by the CPU 202 of the image forming apparatus 102.

The job management unit 307 analyzes the print job, and determines whether or not a storing setting is set (step S801). If storing setting is set, the job management unit 307 determines that the print job is to be stored (step S805). If the print job is a print job for which "store" is selected as a printing method, it indicates that a storing setting is set for the print job. If a storing setting is not set, the job management unit 307 analyzes the print job, and determines whether or not a secure job setting is set (step S802). If the print job is a print job for which "secure print" is selected as a printing method, a secure job setting is set for the print job. If a secure job setting is set, the job management unit 307 determines that the print job is to be stored (step S805). If a secure job setting is not set, the storage control unit 305 obtains a setting value of forced withholding stored in the HDD 205, and passes the setting value to the job management unit 307 via a data management unit. A setting of forced withholding is set by the manager of the image forming apparatus 102 in advance. When a setting of forced withholding is set to ON, a print job that has entered the image forming apparatus 102 is mandatorily (in other words, regardless of the settings of the print job) stored in the HDD 205. The job management unit 307 determines, based on the setting value of forced withholding, whether or not a setting of forced withholding is set (step S803). If a setting of forced withholding is set, the job management unit 307 determines that the print job is to be stored (step S805). If a setting of forced withholding is not set, the job management unit 307 determines that the print job is not to be stored (step S804). In step S703 in FIG. 7, the procedure branches according to the determination results in steps S804 and step S805.

FIG. 9 is a diagram illustrating an example of a bibliographic information list 901 stored in the HDD 205. The bibliographic information list 901 includes "time and date" 902 when the print job was submitted, "user name" 903 of the user that submitted the print job, "storage location" 904 of the submitted print job, "print job name" 905, and "print settings" 906. The "print settings" 906 includes the number of copies, color selection, double-sided print (also referred to as "double-sided printing"), page aggregation (also referred to as "page layout"), and binding. Note that the bibliographic information list 901 is not limited thereto, and, for example, settings of a stapler and the like may also be included as print settings. Pieces of bibliographic information 907 to 910 indicate pieces of bibliographic information of the respective print jobs. The bibliographic information 907 is bibliographic information of a print job entered with print settings such as the number of copies: one, color selection: automatic, double-sided print: not set, page aggregation: 1-in-1, and bookbinding: not set. The bibliographic information 908 is bibliographic information of a print job entered with print settings such as the number of copies: one, color selection: automatic, double-sided print: set (since bookbinding settings are set), page aggregation: 1-in-1, and bookbinding: set. The bibliographic information 909 is bibliographic information of a print job entered with print settings such as the number of copies: two, color selection: automatic, double-sided print: not set, page aggregation: 1-in-1, and bookbinding: not set. The bibliographic information 910 is bibliographic information of a print job entered with print settings such as the number of copies: 5, color selection: black and white, double-sided print: not set, page aggregation: 2-in-1, and bookbinding: not set.

Print Job List

Here, a print job list displayed on the operation unit 207 by the UI control unit 302 will be described. The user performs an operation on a log-in screen (not illustrated) displayed on the operation unit 207, and logs in the image forming apparatus 102. The user then performs an operation on a function selection screen (FIG. 10 to be described later, etc.) displayed on the operation unit 207, so as to display a user's print job list stored in the image forming apparatus 102. The "user's print job list" is a list of print jobs whose bibliographic information includes a user name that matches the user name of the user that logged in. In this embodiment, a description will be given using an example in which a user whose user name is User1 carries out this operation. When the UI control unit 302 receives a display request of a print job list, the data management unit 304 obtains bibliographic information of User1 from bibliographic information stored in the HDD 205 through print job entering processing, via the storage control unit 305. The UI control unit 302 displays the obtained bibliographic information on the operation unit 207 as a list associated with print jobs. This screen is also referred to as a print job list screen. In this manner, the UI control unit 302 displays information of print jobs that User1 entered, using the bibliographic information list of the print jobs of User1.

Figure 10:
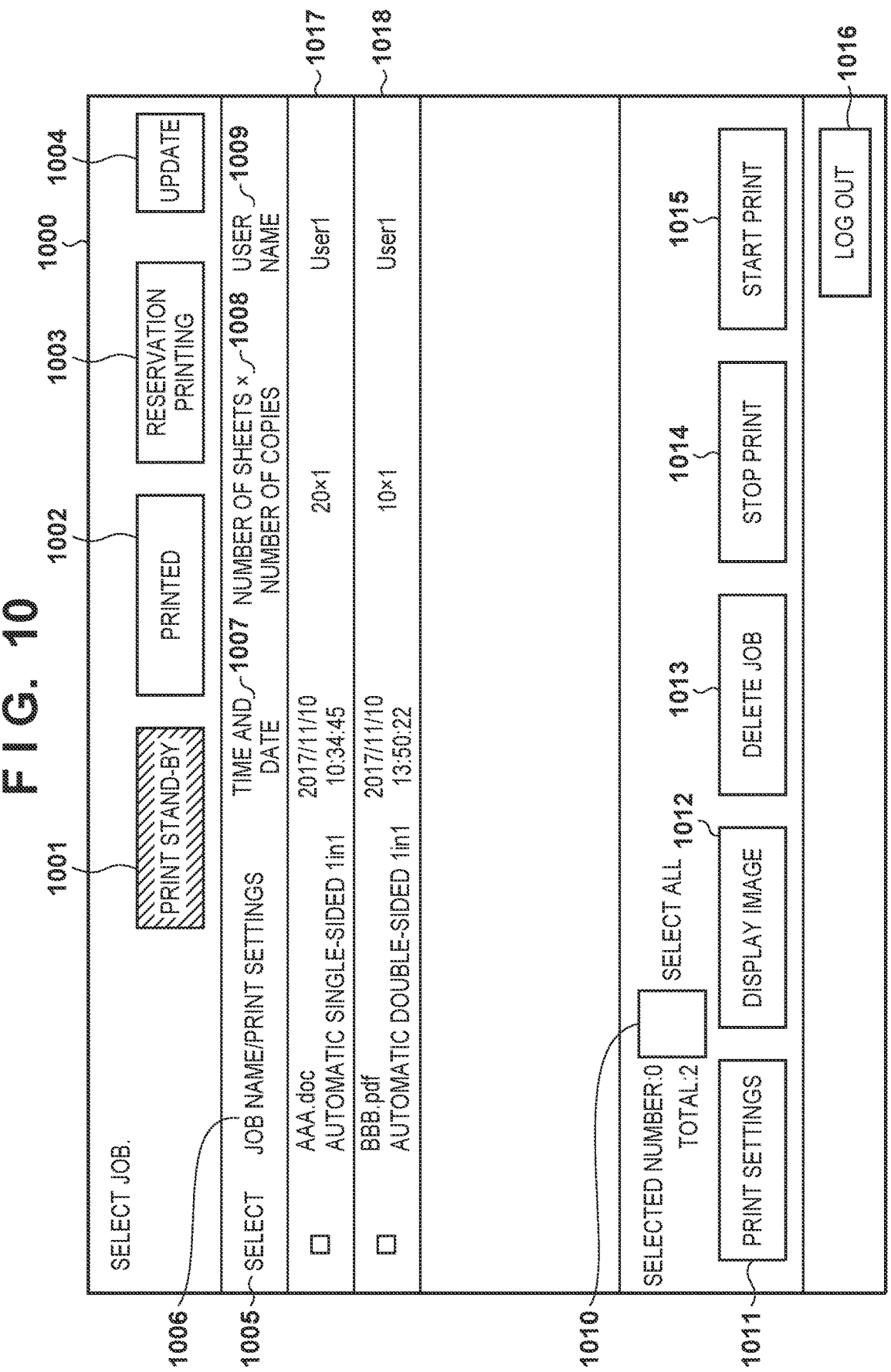
FIG. 10 is a diagram showing an example of a print job list.

FIG. 10 shows an example of a print job list 1000 of User1 that is displayed on the operation unit 207. In this screen, it is possible to perform an operation on print jobs held by the user. FIG. 10 shows an example in which a list of print jobs in a print-standby state is displayed. Note that, an initial state may be a state where only operation portions 1001 to 1003 are displayed on the print job list 1000. When the user selects "print stand-by" 1001, the job management unit 307 obtains the user name of the log-in user from the authentication unit 303. Bibliographic information corresponding to the log-in user is then searched for by searching the bibliographic information list 901 for bibliographic information that includes the user name, using the obtained user name. If there is bibliographic information corresponding to the log-in user, the UI control unit 302 displays the obtained bibliographic information on the operation unit 207. The displayed bibliographic information indicates corresponding print jobs, and hereinafter, this bibliographic information may be referred to as print jobs. For example, if the user name of the log-in user is User1, the bibliographic information 907 and the bibliographic information 908 can be obtained from the bibliographic information list 901. The obtained pieces of bibliographic information are respectively displayed in print job display fields 1017 and 1018.

If the user selects "printed" 1002, the job management unit 307 displays bibliographic information of print jobs that were printed in the past, on a screen that is not illustrated. A display mode thereof may be similar to that shown in FIG. 10. If the user selects "reservation printing" 1003, the job management unit 307 searches the bibliographic information list 901 for a reserved print job for which a printing time is set, and displays the reserved print job on a screen that is not illustrated. A display mode thereof may be similar to that in FIG. 10. If the user selects "update" 1004, the job management unit 307 searches the bibliographic information list 901 under a condition used when the most recent search was performed, and the UI control unit 302 updates the displayed bibliographic information. Checkboxes 1005 indicate selection, and indicate the selected states of bibliographic information according to an operation performed by the user. Specifically, the screen in FIG. 10 is a selection receiving screen for receiving selection of a print job, and a print job can be selected by checking a checkbox 1005. Note that the selecting method may be another method. In "job name/print setting" 1006, the UI control unit 302 displays "print job name" 905 and a portion of "print settings" 906. Note that display of the "print settings" 906 is not limited thereto. In "time and date" 1007, the UI control unit 302 displays time and date the same as "time and date" 902. In "the number of sheets×the number of copies" 1008, the UI control unit 302 displays the number of sheets obtained by analyzing the print job and the number of copies the same as that in the "print settings" 906. In "user name" 1009, the UI control unit 302 displays a user name the same as "user name" 903. The bibliographic information of the print job of User1 is displayed in "print job display" fields 1017 and 1018.

If the user selects "select all" 1010, the UI control unit 302 checks the selection checkboxes 1005 corresponding to all of the print jobs (for example, the print job display fields 1017 and 1018), and brings all of the print jobs included in the screen into a selected state. Here, if the number of print jobs is too many to display, print jobs that cannot be displayed are also included. Note that to select a print job display field means to select a corresponding print job.

If the user selects one of the print job display fields 1017 and 1018, and then selects "print settings" 1011, the UI control unit 302 displays a print setting screen for changing the print settings of the selected print job. The print setting screen will be described later in detail. If the user selects a plurality of print jobs from the print job display fields 1017 and 1018, and then selects "print settings" 1011, the UI control unit 302 displays a (collective) print setting screen for changing print settings of all of the selected print jobs. When "print settings" 1011 is selected, if print jobs selected at this point include a secure print job, the user may be requested to input a password before the print setting screen is displayed. In this case, if authentication of the input password is successful, the print setting screen may be displayed. In this embodiment, if both the print job display fields 1017 and 1018 are selected, the (collective) print setting screen is displayed. The (collective) print setting screen will be described later in detail.

If the user selects one of the print job display fields 1017 and 1018 and then selects "display image" 1012, the UI control unit 302 displays a preview image of the selected print job on a preview screen that is not illustrated. If the user selects one of the print job display fields 1017 and 1018, and then selects "delete job" 1013, the job management unit 307 deletes the selected print job. If the user selects one of the print job display fields 1017 and 1018, and then selects "stop print" 1014, when the selected print job is being printed, the job management unit 307 stops the printing processing. If the user selects one of the print job display fields 1017 and 1018, and then selects "start print" 1015, the job management unit 307 executes printing of the selected print job. If the user selects "log out" 1016, the authentication unit 303 carries out log-out processing, and the UI control unit 302 displays, on the operation unit 207, a user authentication screen that is not illustrated. When not only "print settings" 1011 but also above-described "display image" 1012, "delete job" 1013, and "stop print" 1014, "start print" 1015 are selected, the user may be requested to input a password before processing corresponding to each operation is executed. Note that this applies to a case where print jobs selected at this point include a secure print job. In this case, if authentication of the input password is successful, processing corresponding to an operation may be executed.

Change Print Settings (Job Unit)

Figure 11B:
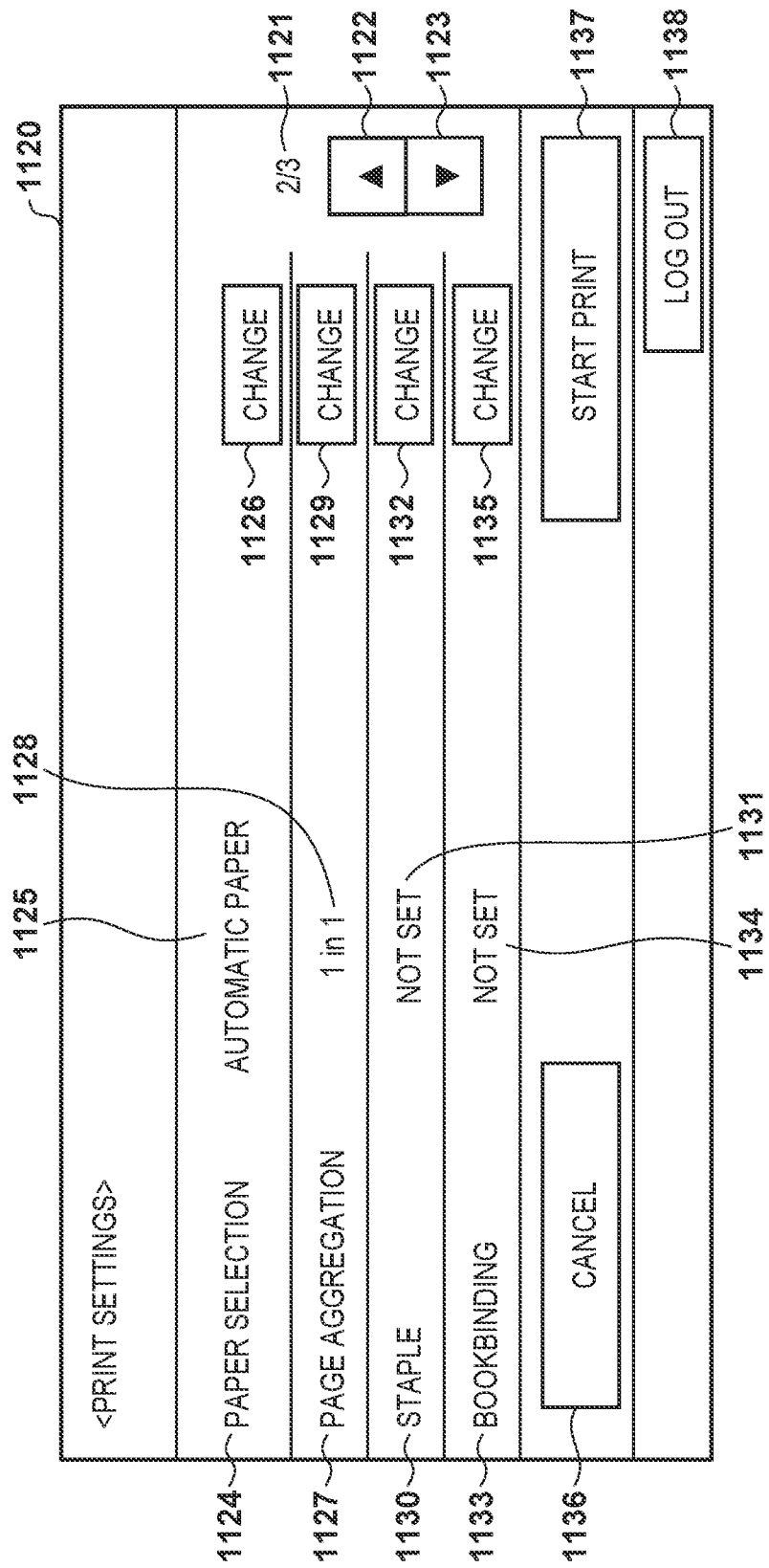
Figure 11C:
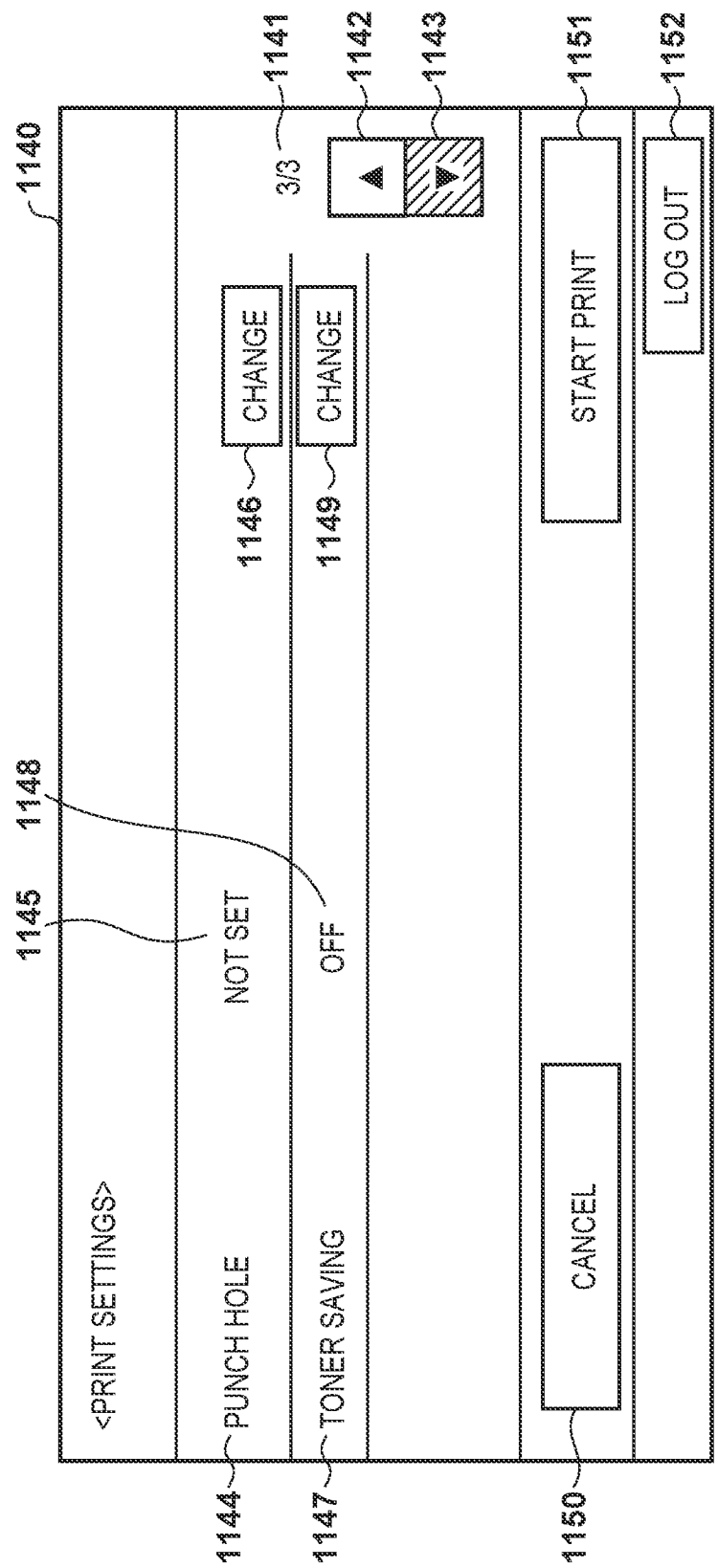

FIGS. 11A to 11C each show an example of the aforementioned print setting screen. It can be said that the print setting screen is a change reception screen for receiving a change in a print setting. If a plurality of print settings are to be changed and, for this reason, all cannot be displayed in one screen, the display may be separated into a plurality of screens as in FIGS. 11A to 11C. The screens in FIGS. 11A to 11C are displayed, for example, when one print job is selected from the print job list display screen 1000, and an operation is performed on "print settings" 1011.

FIG. 11A shows a first screen 1100 of the print settings. Reference numeral 1101 denotes the current page number and the number of all of the pages of the print setting screen. Reference numeral 1101 indicates that there are three pages in total, and the first page is currently displayed. Reference numeral 1102 denotes a button for displaying a previous page. In the illustrated example, there is no previous page than the first page, and thus this button is displayed in a shaded manner, preventing the user to perform an operation. Reference numeral 1103 denotes a button for displaying the next page. Reference numeral 1104 denotes a setting of the number of copies. Reference numeral 1105 denotes the current setting value of the number of copies. The current setting value is 1. Reference numeral 1106 denotes a minus button. The minus button is used for decreasing the number of copies by one. In the illustrated example, the current setting value of the number of copies 1105 is set to 1, and the lower limit of the number of copies is 1, and thus the minus button 1106 is displayed in a shaded manner, preventing the user to perform an operation. Reference numeral 1107 denotes a plus button. The plus button is used for increasing the number of copies by one. Reference numeral 1108 denotes a setting of a print range (or printing range). Reference numeral 1109 denotes the current setting value of a print range. The current setting value is set to all of the pages. This means that all of the pages of the print job are to be printed.

Reference numeral 1110 denotes a change button, and, if it is pressed, a screen for changing the print range (not illustrated) is displayed. In this example, a button is shown as a control (or also referred to as "display item") for changing the setting, but another type of control may be used. A user may select a control such as a button displayed in a user interface window by touching or pressing the control. Reference numeral 1111 denotes a setting of color selection. Reference numeral 1112 denotes the current setting value of color selection. The current setting value is set to automatic (colored/monochrome). This means that a switch is automatically made between color printing and monochrome printing according to the content of each of the pages of the print job. Reference numeral 1113 denotes a change button, and, if it is pressed, a screen for changing color selection (not illustrated) is displayed. Reference numeral 1114 denotes a setting of double-sided print. Reference numeral 1115 denotes the current setting value of double-sided print. The current setting value is not set. This means that the print job is to be printed with a single-sided setting. Reference numeral 1116 denotes a change button and, if it is pressed, a screen for changing double-sided print (not illustrated) is displayed. Reference numeral 1117 denotes a cancel button, and, if it is pressed, a change in the print setting set on the print setting screen is invalidated, and the previous screen is returned. Reference numeral 1118 denotes a print start button, and, if it is pressed, a change in the print setting set on the print setting screen is applied, and printing of the print job is started. Reference numeral 1119 denotes a log-out button, and, if it is pressed, the authentication unit 303 carries out log-out processing, and the UI control unit 302 displays a user authentication screen (not illustrated) on the operation unit 207.

FIG. 11B shows a second screen 1120 of the print settings. This screen is displayed by the button 1103 being pressed. The second screen 1120 has a configuration similar to that of the first screen 1100, and also has similar functionality, and thus only the differences from the print setting screen in the first page 1100 will be described. Reference numeral 1124 denotes a setting of paper selection. Reference numeral 1125 denotes the current setting value of paper selection. The current setting value is set to automatic paper selection. This means that an optimum paper feeding stage is automatically determined, in a paper feeding unit that is used during printing, in accordance with the print job. Reference numeral 1126 denotes a change button, and if it is pressed, a screen for changing automatic paper selection (not illustrated) is displayed. Reference numeral 1127 denotes a setting of page aggregation. Reference numeral 1128 denotes the current setting value of page aggregation. The current setting value is set to 1-in-1. This means that each page of the print job is laid out onto one sheet of paper, and printing is performed. Commonly, N-in-1 refers to a layout in which N pages of a print job is fitted into one page of a print medium. Reference numeral 1129 denotes a change button, and, if it is pressed, a screen for changing page aggregation (not illustrated) is displayed. Reference numeral 1130 denotes a staple setting that is a type of printing post-processing. Reference numeral 1131 denotes the current setting value of staple setting. The current setting value is not set. This means that sheets are not to be bound using the staple after printing. Reference numeral 1132 denotes a change button, and, if it is pressed, a screen for changing the staple setting (not illustrated) is displayed. Reference numeral 1133 denotes a bookbinding setting that is a type of printing post-processing. Reference numeral 1134 denotes the current setting value of bookbinding. The current setting value is not set. This means that bookbinding is not performed after printing. The bookbinding setting here may be simple bookbinding processing that is executed after printing by the image forming apparatus 102. The bookbinding setting is, for example, processing for arranging pages into a 2-in-1 layout on the two sides of sheets, binding a predetermined number of sheets at a center portion in the longitudinal direction of the sheets using a staple in a state where the sheets are stacked, and folding the sheets in two. Reference numeral 1135 denotes a change button, and, if it is pressed, a screen for changing the bookbinding setting (not illustrated) is displayed.

FIG. 11C shows a third screen 1140 of the print settings. This screen is displayed when a button 1123 is pressed. The screen 1140 has a configuration similar to that of the first screen 1100, and has also a similar functionality, and thus only differences from 1100 will be described. Reference numeral 1144 denotes a setting of punch hole processing that is a type of printing post-processing. Reference numeral 1145 denotes the current setting value of punch hole processing. The current setting value is not set. This indicates that punch hole processing is not to be performed after printing. Reference numeral 1146 denotes a change button, and, if it is pressed, a screen for changing punch hole processing (not illustrated) is displayed. Reference numeral 1147 denotes a setting of toner saving. Reference numeral 1148 denotes the current setting value of toner saving. The current setting value is set to OFF. This means that printing is to be performed without using a function of decreasing the amount of toner that is used during printing. Reference numeral 1149 denotes a change button, and, if it is pressed, a screen for changing toner saving (not illustrated) is displayed.

Change Print Settings (Collective)

FIGS. 12A and 12B show an example of the aforementioned (collective) print setting screen. The screens in FIGS. 12A and 12B are displayed when a plurality of print jobs are selected from the print job list display screen 1000, and an operation is performed on "print settings" 1011, for example.

FIG. 12A shows an initial screen 1200 that is first displayed when displaying the (collective) print setting screen. Reference numeral 1201 denotes the number of selected jobs. In this field, the number of print jobs selected from the print job list 1000 is displayed. Specifically, it is indicated that the print settings for the number of jobs displayed here are to be collectively changed. Reference numeral 1202 denotes a change button for enabling a function of changing the number of copies, and, if it is pressed, the function of changing the number of copies is enabled. Reference numeral 1203 denotes a change button for enabling a function of changing a color mode to a monochrome mode, and, if it is pressed, the color setting is set to monochrome. In this example, only a setting change to monochrome is permitted, and thus it is not required to enable a function for performing the color setting. However, a configuration may also be adopted in which a function for changing the color setting is enabled, and the setting is changed using the function (and a user interface). Reference numeral 1204 denotes a change button for enabling a function of performing double-sided print, and, if it is pressed, a function for performing a double-sided print setting is enabled. Reference numeral 1205 denotes a change button for enabling a function of performing page aggregation, and, if it is pressed, the function of setting page aggregation is enabled. Reference numeral 1206 denotes a cancel button, and, if it is pressed, a change in a print setting set in the (collective) print setting screen is invalidated, and returns to the previous screen. Reference numeral 1207 denotes a print start button, and, if it is pressed, a change in a print setting set in the (collective) print setting screen is applied to all of the print jobs selected from the print job list 1000, and printing of the print jobs is started. Reference numeral 1208 denotes a log-out button, and if it is pressed, the authentication unit 303 carries out log-out processing, and the UI control unit 302 displays a user authentication screen (not illustrated) on the operation unit 207. Note that, although not illustrated in FIG. 12A, if a plurality of print jobs targeted for collective setting change include a print job in which some setting items cannot be changed, the change buttons of the setting items may be displayed in a gray out manner, for example. In that case, the operation button displayed in a gray out manner is kept from being operated.

FIG. 12B shows a screen example 1220 when all of the change buttons 1202 to 1205 are selected in the initial screen 1200. Change buttons 1222, 1226, 1228, and 1231 are selected. Items denoted by reference numerals 1221, 1234, 1235, and 1236 are respectively the same as those denoted by 1201, 1206, 1207, and 1208, and thus a description thereof is omitted. Items denoted by reference numerals 1223, 1224, and 1225 are respectively the same as those denoted by 1105, 1106, and 1107, and thus a description thereof is omitted. Items denoted by reference numerals 1229, 1230, 1232, and 1233 are respectively similar to those denoted by 1115, 1116, 1128, and 1129, and thus a description thereof is omitted. Reference numeral 1227 denotes the current setting value of a color setting. In the example in the figure, the current setting value is set to monochrome. This means that all of the pages of a print job are to be printed in monochrome. In a collective change in the print settings, unlike "color selection" 1111, a change to color setting other than monochrome cannot be made, and thus no change button is displayed.

Print Setting Change Processing

Next, processing for changing the print settings of a hold print job will be described in which the user performs an operation on the image forming apparatus 102.

Figure 13:
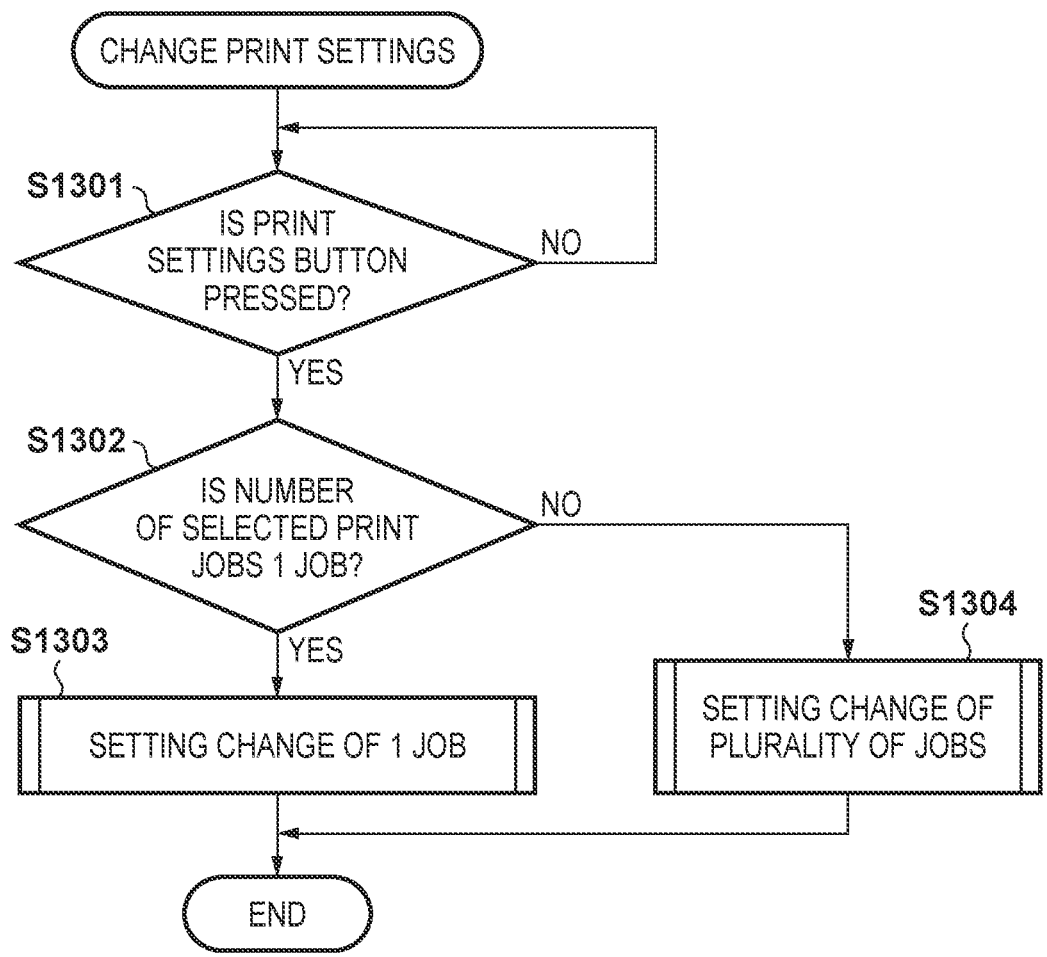
FIG. 13 is a flowchart illustrating processing for changing a print setting of one or more hold print jobs.

FIG. 13 is a flowchart illustrating processing for changing the print settings of one or more hold print jobs, in the system software 301, which is executed by the CPU 202 of the image forming apparatus 102. The user performs an operation on the print job list 1000 displayed on the operation unit 207 so as to change print settings. The UI control unit 302 waits until a print setting button 1011 is pressed by the user (step S1301). The user selects one or more print jobs, and presses the print setting button 1011. When the print setting button 1011 is pressed, the UI control unit 302 determines whether the number of print jobs selected from the print job list 1000 is one or more than one (step S1302). If the result of the determination in step S1302 indicates that the number of selected print jobs is one, the UI control unit 302 carries out processing of a setting change of one job (step S1303). The processing in step S1303 will be described later in detail. If the result of the determination in step S1302 indicates that a plurality of print jobs are selected instead of one job, the UI control unit 302 carries out processing of a setting change of a plurality of jobs (step S1304). The processing in step S1304 will be described later in detail.

Setting Change of One Job

Figure 14:
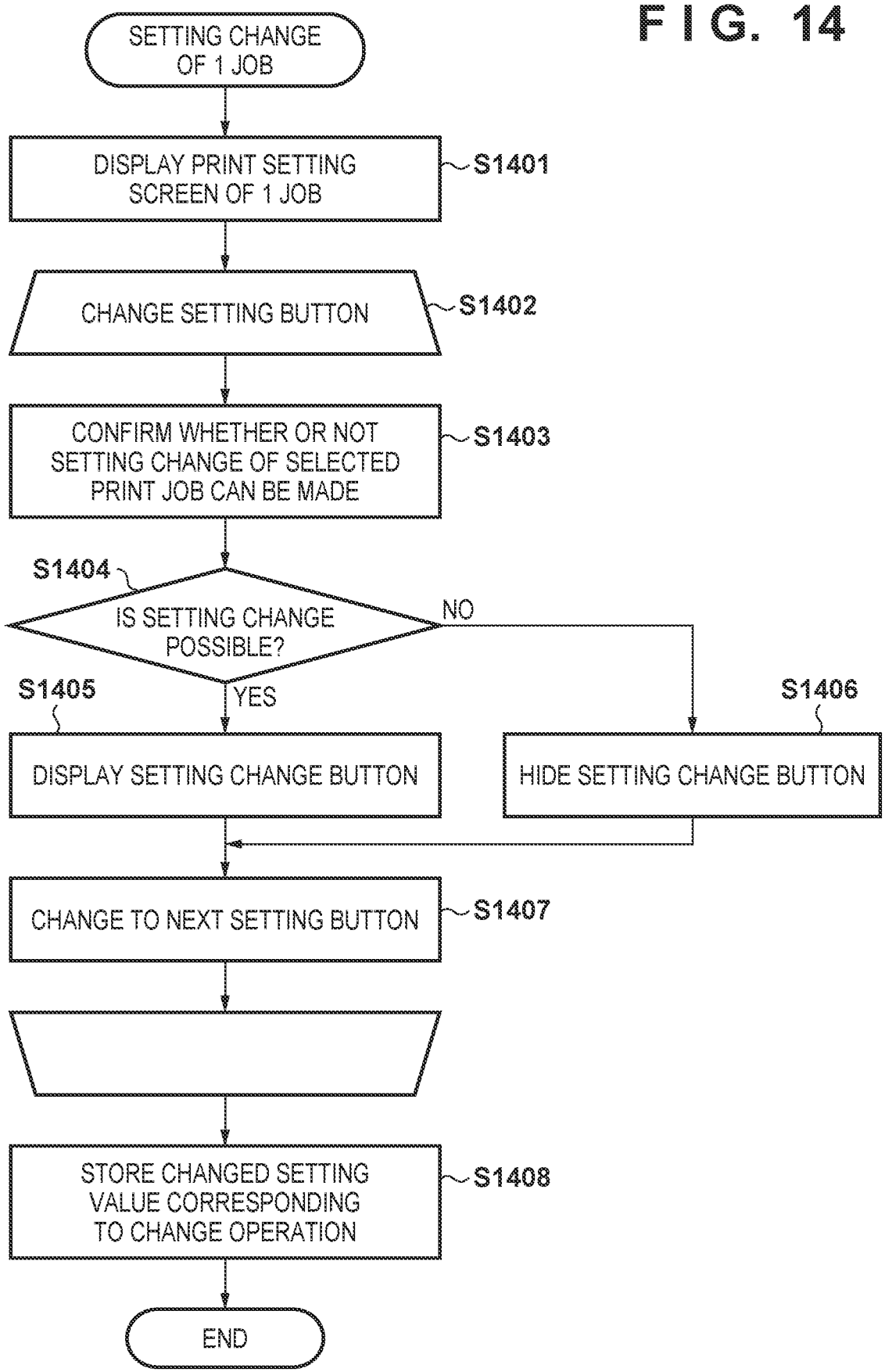
FIG. 14 is a flowchart illustrating processing of a setting change for changing a setting of one job.

FIG. 14 is a flowchart illustrating the processing of a setting change of one job in step S1303, in the system software 301, which is executed by the CPU 202 of the image forming apparatus 102. In this embodiment, a description will be given using an example in which a user whose user name is User1 displays the screen of the print job list 1000, checks the select checkbox 1005 of a print job 1018, and then presses the print setting button 1011.

The UI control unit 302 displays a print setting screen 1600 of one job on the operation unit 207 (step S1401). FIG. 16 shows an example of the print setting screen 1600 that is displayed. After step S1401, the UI control unit 302 repeats steps S1403 to S1407 and performs processing sequentially for all of the change buttons (1610, 1613, and 1616) (step S1402). The change buttons correspond to setting items for which a setting change is to be made, and thus, in step S1402, a focus is sequentially placed on print setting items corresponding to the change buttons. The UI control unit 302 first performs processing with a focus on the change button 1610 of "print range" 1608. The UI control unit 302 confirms whether or not a setting change of "print range" 1608 can be made (step S1403). Determination on whether or not a setting change can be made is performed based on a change determination list 1501 shown in FIGS. 15A and 15B. The change determination list 1501 will be described after the description that is given with reference to FIG. 14.

As a result of the confirmation in step S1403, the UI control unit 302 determines whether or not a setting change of the setting item that is in focus can be made (step S1404). In the above example, a focus is placed on the change button 1610 of "print range" 1608, and thus, in step S1404, a determination is made as to whether or not a setting change of a print range setting that is a corresponding setting item can be made. The UI control unit 302 displays a change setting button corresponding to the setting item for which it was determined that a setting change can be made as a result of the determination in step S1404 (step S1405). Conversely, the UI control unit 302 hides a change setting button corresponding to the setting item for which it was determined that a setting change cannot be made as a result of the determination in step S1404, so that the user cannot perform an operation on the button (step S1406). Here, a configuration is adopted in which a change setting button is hidden, but it suffices that control is performed so as to prevent the user from performing an operation, and thus, for example, the change setting button may be displayed in a shaded manner. For example, a configuration can also be adopted in which a button is displayed in a shaded manner if a button operation can be performed as a result of the user making a certain change, and the button is hidden if a button operation cannot be performed even if the user changes anything. Here, if it is determined in step S1404 that a setting change of the change button 1610 of "print range" 1608 cannot be made, the change button 1610 is hidden in step S1406. Note that, in the print setting screen 1600, a change button 1601 is indicated as a dotted line for ease of description, but the change button 1601 is actually hidden, and thus a configuration may also be adopted in which nothing is displayed.

Next, the processes in steps S1403 to S1406 are carried out similarly for the change button 1613 of next "color selection" 1611 (step S1407). In this case, a setting item that is in focus is a color selection setting. If the determination result of the color selection setting indicates that a setting change can be made, the change button 1613 of "color selection" 1611 is displayed in the process of step S1405. The same applies to a change button 1616 of "double-sided print" 1614, and, in the example in FIG. 16, it is determined that a setting change cannot be made, and the change button 1616 is hidden.

Then, if the user performs an operation on a change button displayed in this manner, and a setting item corresponding to the change button on which the operation was performed is changed, the setting value thereof is stored (step S1408). For example, if a setting change was made, the IDs of selected print jobs, an ID indicating a setting item changed by an operation performed on any change button, and the changed value may be stored in association with each other in a region indicating the setting change. Note that in this embodiment, the setting value of the changed print setting is stored while holding the print settings received along with print jobs, but the setting value of the setting item on which a change operation was performed from among the print settings of the selected print jobs may be replaced with the changed value.

As described above, a determination is made, for each setting item, as to whether or not a setting change is permitted, and if a setting change is permitted, a corresponding change button is displayed, and if a setting change is not permitted, a corresponding change button is hidden, whereby a setting change can be permitted or forbidden.

Change Determination List

The change determination list 1501 that is referenced in step S1403 includes the following items. "Determination condition" 1502 is a determination condition for determining whether or not a setting change can be made. "Target item" 1503 refers to a setting item that requires a determination as to whether or not a setting change is permitted according to "determination condition" 1502. This setting item is an item corresponding to a change setting button shown in FIG. 16. An item marked as "necessary" in "target item" 1503 is a setting item targeted for determination according to "determination condition" 1502. Here, as an example, setting items such as the number of copies, a print range, color selection, change to monochrome, double-sided print, and page aggregation are described. However, of course, if another print setting item is targeted for a setting change in the image forming apparatus 102, similar determination is required. "Determination result" 1504 indicates a determination result for "target item" 1503 that requires determination with respect to a determination condition that is in focus. In "determination result" 1504, conditions under which a setting change can be made and conditions under which a setting change cannot be made are included. In this example, there are 11 determination conditions, namely determination conditions 1505 to 1515. For example, regarding setting items such as a print range, double-sided print, and page aggregation, whether or not a setting change of each of such setting items is permitted needs to be determined based on a determination condition "has the print job undergone bookbinding imposition?". On the other hand, regarding the setting items such as the number of copies, color selection, and change to monochrome, a setting change is not disabled according to the determination condition, and the determination is not necessary. If the determination is not necessary, a setting change can be made. In addition, in a setting item that requires determination, if "no bookbinding imposition" is set, a setting change can be made, and if "bookbinding imposition has been performed" is set, a setting change cannot be made. In a determination as to whether or not a setting change can be made, in a print setting to be changed, a focus is placed on each "target item" 1503. In addition, regarding all of the "target items" 1503 that are in focus, with respect to "determination conditions" 1502 for which a determination is "necessary", whether or not a change can be made is determined based on print settings of selected print jobs and "determination result" 1504. If a focus is placed on a certain target item, and determination results for all of the determination conditions indicate that a setting change can be made, it is determined that a setting change of the target item can be made. If the determination results include at least one determination condition under which it is determined that a setting change cannot be made, it is determined that a setting change of the target item cannot be made. This processing is performed on all of the target items while changing a target item.

Note that FIGS. 15A and 15B may be realized by a table stored in the image forming apparatus 102 in advance. In that case, for example, IDs of setting items that are used as determination conditions are stored in "determination condition" 1502 in the table. Also, codes indicating that determination is necessary and unnecessary are stored in "target item" 1503 in association with the IDs of the target items. Codes indicating that a setting change can be made and cannot be made are stored in "determination result" 1504 in association with the values of "determination condition" 1502. Of course, this is only an example.

To give further description using an example, "print range" 1608 corresponds to a print range setting. In addition, referring to the print range settings in "target item" 1503 in FIG. 15A, conditions that requires determination are known. In this example, conditions that require determination include "has the print job undergone bookbinding imposition?", "has device bookbinding been set on the print job?", "has a layout other than a 1-in-1 layout been set on the print job?", and "is PDL type of the print job JPEG?". Accordingly, by referencing the print settings of selected print jobs, a determination is made as to whether or not setting items have corresponding setting values such that a setting change can be made. For example, it suffices for the bookbinding setting to be referenced in order to make a determination regarding the condition "has the print job undergone bookbinding imposition?", bookbinding setting is set on the print job 1018, and the print job 1018 has undergone bookbinding imposition. Therefore, the "determination result" 1504 is referenced, and it is determined that a setting change of the print range cannot be made regarding this print job.

Regarding the condition "has device bookbinding been set on the print job?", device bookbinding is not set on the print job 1018, and thus it is determined that a setting change can be made. Regarding the condition "has a layout other than a 1-in-1 layout been set on the print job?", layout settings of the print job 1018 are set to 1-in-1, and thus it is determined that a setting change can be made. Note that it may be determined that the bookbinding setting is a setting other than the setting of 1-in-1. In that case, it is determined that a setting change cannot be made. Regarding the condition "is PDL type of print job JPEG?", here, assuming that the PDL type of the print job 1018 is not JPEG, it is determined that a setting change can be made. Here, the determination result of "has the print job undergone bookbinding imposition?" indicates that a setting change cannot be made, and thus it is determined that a setting change of "print range" 1608 cannot be made. For example, if the determination result of a determination condition indicates that a setting change cannot be made, the final determination result indicates that a setting change cannot be made even if a determination regarding further determination conditions is not carried out, and thus a further determination does not need to be made.

When a determination is made as to whether or not a change can be made based on FIGS. 15A and 15B, whether or not a setting change of the print job 1018 can be made is as shown in FIG. 16. Accordingly, regarding the change button 1613 of "color selection" 1611, all of the determination results in the change determination list 1501 indicate that a setting change can be made, and thus it is determined that a setting change can be made. Therefore, the change button 1613 is displayed in the process of step S1405. Regarding the change button 1616 of "double-sided print" 1614, the print job 1018 has undergone bookbinding imposition as shown in 1505, and thus it is determined that a setting change cannot be made. Therefore, the change button 1616 is hidden in the process of step S1406. In this manner, a configuration can be adopted in which a change is permitted for items for which a setting change can be made, and a change is not permitted for items for which a setting change cannot be made.

Collective Setting Change of Plurality of Jobs

Figure 17:
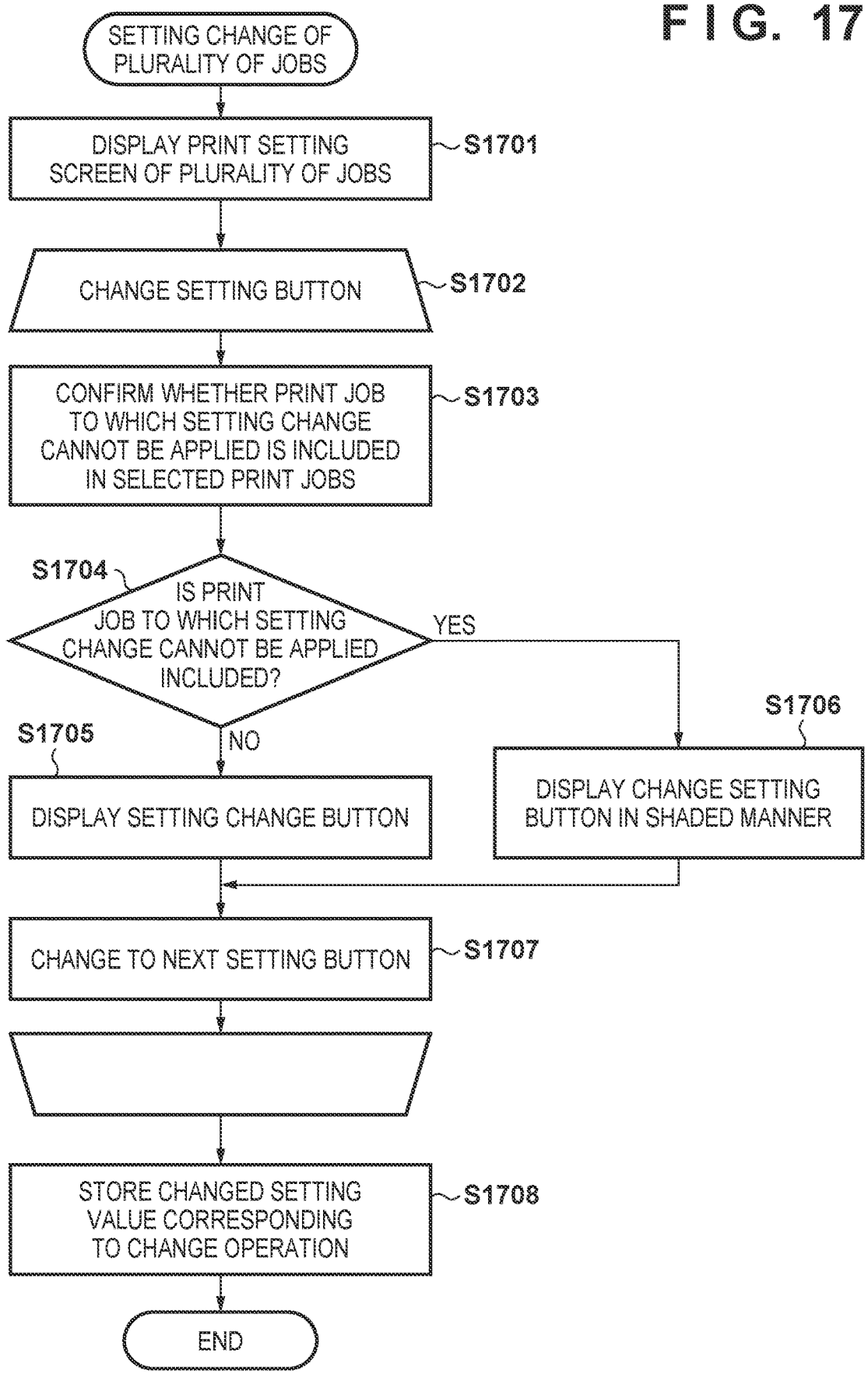
FIG. 17 is a flowchart illustrating processing of a setting change of a plurality of jobs.

FIG. 17 shows a flowchart illustrating processing of a setting change of a plurality of jobs in step S1304, in the system software 301, which is executed by the CPU 202 of the image forming apparatus 102. In this embodiment, a description will be given using an example in which the user whose user name is User1 displays the screen of the print job list 1000, selects the print jobs 1017 and 1018 (by checking the checkboxes 1005), and presses the print setting button 1011.

Figure 18:
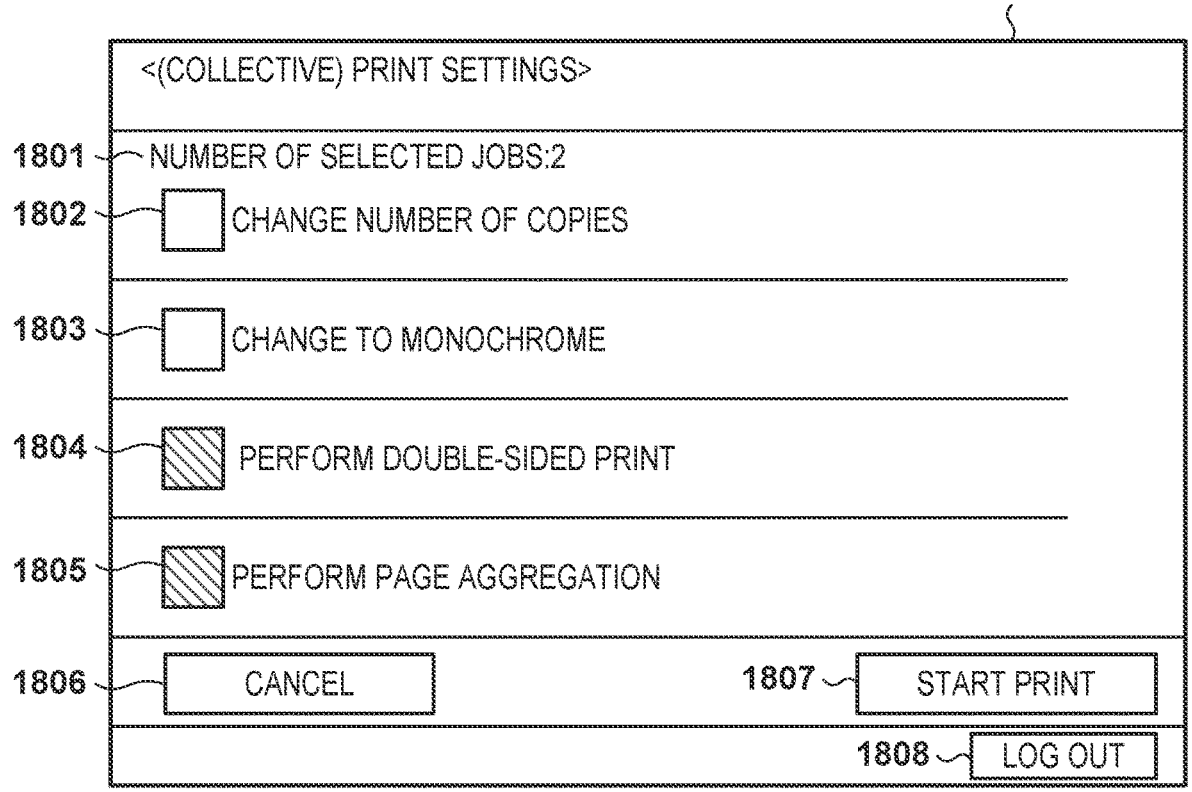
FIG. 18 is a diagram showing a (collective) print setting screen.

The UI control unit 302 displays a print setting screen 1800 of a plurality of jobs on the operation unit 207 (step S1701). FIG. 18 shows the (collective) print setting screen that is displayed. After step S1701, the UI control unit 302 repeats steps S1703 to S1707 and performs processing sequentially for all of the change buttons (1802, 1803, 1804, and 1805) (step S1702). The change buttons correspond to setting items for which a setting change is to be made, and thus, in step S1702, a focus is sequentially placed on print setting items corresponding to the change buttons. The UI control unit 302 first performs processing with a focus on the change button 1802 for changing the number of copies. The UI control unit 302 confirms whether or not print jobs (the print jobs 1017 and 1018) selected from the print job list 1000 include a print job to which a setting change for changing the number of copies cannot be applied (step S1703). For this purpose, a focus is placed on one of the target items, and a determination is made as to whether or not the target item can be changed, for each of the plurality of selected jobs. Determination regarding individual print jobs may be similar to that described with reference to FIG. 14. Regarding a target item that is in focus, if it is determined that at least one print job from among the selected print jobs cannot be changed, it is sufficient to determine that a collective change for the target item is not permitted.

To be more specific, the determination in step S1703 is performed based on the change determination list 1501 shown in FIGS. 15A and 15B. However, the number of copies is not a print setting that can be changed under the influence of the settings if the determination conditions are limited to those shown in FIGS. 15A and 15B. Therefore, it may be determined that a setting change can be applied, without using the change determination list 1501. This applies to FIG. 14. As a result of confirmation in step S1703, the UI control unit 302 determines whether or not a print job to which a setting change cannot be applied is included regarding the setting item that is in focus (step S1704). If the result of the determination in step S1704 indicates that a print job to which a setting change cannot be applied is included, the UI control unit 302 displays the change setting button in a shaded manner, to prevent the user from performing an operation (step S1706). Here, the change setting button is displayed in a shaded manner, but it is sufficient that control is performed so as to prevent the user from performing an operation, and thus, for example, a configuration may also be adopted in which the change setting button is not displayed. For example, a configuration can also be adopted in which a button is displayed in a shaded manner if a button operation can be performed as a result of the user making a certain change, and the button is hidden if a button operation cannot be performed even if the user changes anything. Note that, regarding the setting item that is in focus, if it is determined that a setting change cannot be made, the procedure may branch to step S1706 without performing subsequent determination from this point.

The UI control unit 302 displays a change setting button corresponding to the setting item determined not to include a print job to which a setting change cannot be applied, as a result of the determination in step S1704 (step S1705). Here, for example, regarding a change in the number of copies, it is determined in step S1704 that a print job to which a setting change cannot be applied is not included, and thus the change button 1802 is displayed in the process in step S1705. Next, the processes in steps S1703 to S1706 are carried out similarly on a change button 1803 for changing the setting to monochrome (step S1707). In this example, regarding color selection that is a setting item corresponding to the change button 1803 for changing the setting to monochrome, it is determined that a setting change of both the print jobs 1017 and 1018 can be made, and thus it is determined that a print job to which a setting change cannot be applied is not included. Therefore, the change button 1803 is displayed in the process in step S1705. Regarding double-sided print that is a setting item corresponding to the change button 1804 for performing double-sided print, a setting change of the print job 1017 can be made. However, the print job 1018 has undergone bookbinding imposition, and thus it is determined that a setting change of double-sided print cannot be made, by referencing the determination result 1505. In other words, it is determined in step S1704 that a print job to which a setting change cannot be applied is included (the print job 1018), and thus the change button 1804 is displayed in a shaded manner in the process in step S1706. In this embodiment, a description is given using an example in which the print jobs 1017 and 1018 are selected from the print job list 1000 (by checking the checkbox 1005) and then the print setting button 1011 is pressed. However, for example, consider a case where the print setting button 1011 is pressed in a state where another print job to which a setting change can be applied is selected, instead of selecting a print job (the print job 1018) to which a setting change cannot be applied. In that case, a setting change can be applied to all of the selected print jobs, and thus the change button 1804 can be displayed in the process in step S1705. Also, if only the print job 1017 is selected, the change button 1804 is displayed through the processing in FIG. 14. In this manner, if a button operation can be performed as a result of the user making a certain change (for example, not selecting the print job 1018), it is desirable that the change button 1804 is displayed in a shaded manner instead of being hidden. Regarding the change button 1805 for performing page aggregation, a setting change of page aggregation that is a corresponding setting item can be made, for the print job 1017. On the other hand, the print job 1018 has undergone bookbinding imposition, and thus it is determined that a setting change of page aggregation cannot be made, for the print job 1018. Accordingly, it is determined in step S1704 that a print job to which a setting change cannot be applied is included (the print job 1018), and thus the change button 1805 is displayed in a shaded manner in the process in step S1706.

Accordingly, in step S1704, a determination is made as to whether or not selected print jobs include a print job to which a setting change cannot be applied, and if such a print job is included, a change setting button is displayed in a shaded manner in step S1706. With these processes, it is possible to perform control so as to prevent the user from performing an operation of changing print settings that cannot be applied. Accordingly, the user is prevented from making an incorrect change of print settings, and thus it is possible to provide the image forming apparatus 102 that is excellent in the usability.

When the user then performs an operation on the change button displayed in this manner, and a setting item corresponding to the change button on which the user performed an operation is changed, the setting value is stored (step S1708). For example, if a setting change was made, the IDs of selected print jobs, an ID indicating a setting item changed by an operation performed on any change button, and changed values may be stored in association with each other in a region indicating the setting change. Note that in this embodiment, the setting value of changed print settings is stored while holding print settings received along with print jobs, but the setting value of a setting item on which a change operation was performed from among the print settings of selected print jobs may be replaced with a changed value.

Printing Processing

Figure 19:
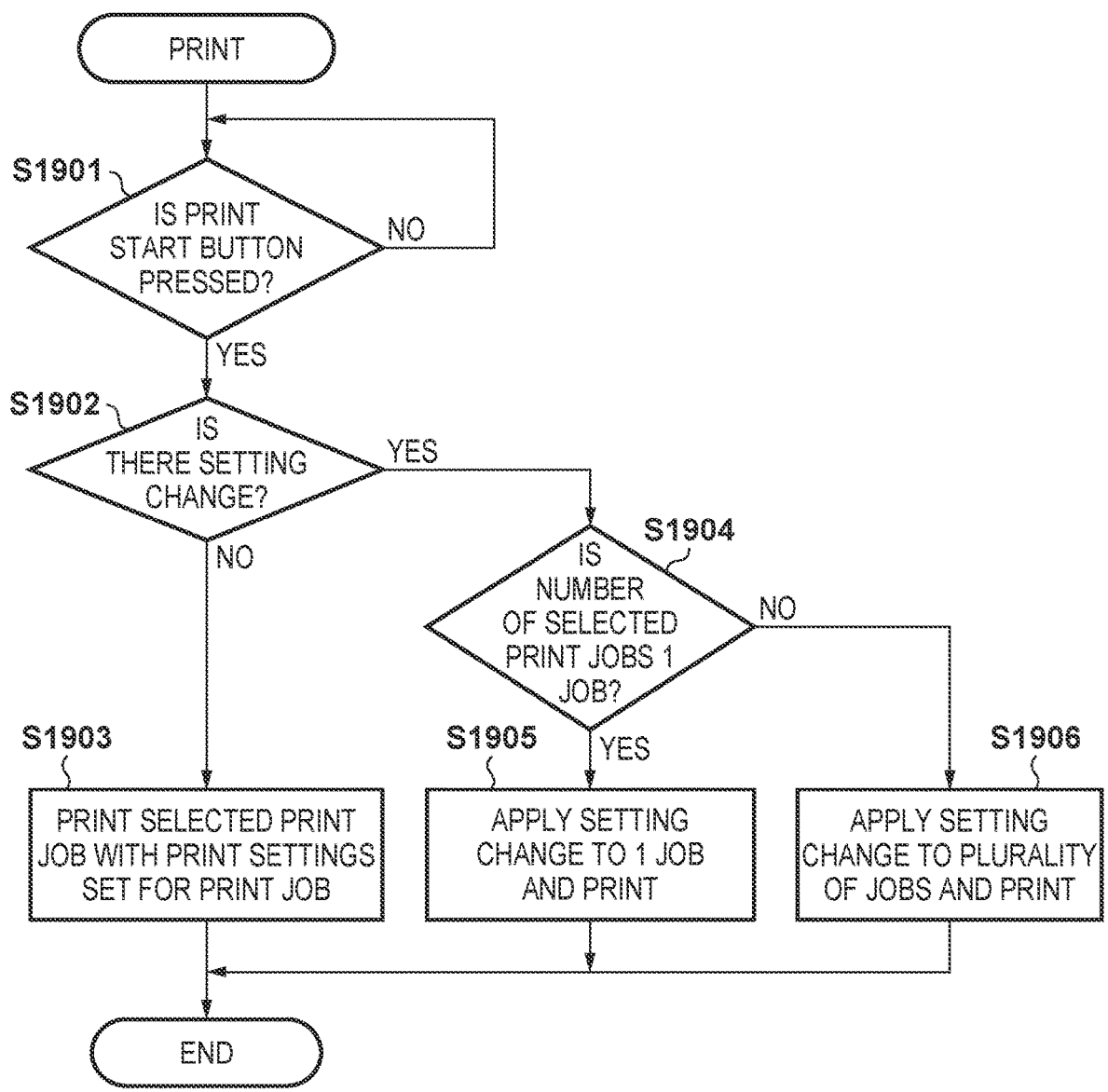
FIG. 19 is a flowchart illustrating processing for performing printing after changing print settings of one or more hold print jobs.

Here, processing for printing after the print settings of a print job held by the user has been changed will be described. FIG. 19 is a flowchart illustrating processing for printing one or more hold print jobs, in the system software 301, which is executed by the CPU 202 of the image forming apparatus 102. The user starts printing processing by pressing a print start button 1807.

The UI control unit 302 waits until the print start button 1807 is pressed by the user (step S1901). If the print start button 1807 is pressed, the UI control unit 302 determines whether or not the print settings have been changed (step S1902). In this determination, a region for storing settings changed as a result of an operation performed on a change button displayed in the procedure in FIG. 14 or 17 is referenced, and if the changed settings are stored, it may be determined that the settings have been changed. If the result of the determination in step S1902 indicates that the print settings have not been changed, the job management unit 307 executes printing of a selected print job with print settings set for the print job (step S1903). If the result of the determination in step S1902 indicates that the print settings have been changed, a determination is made as to whether or not the number of selected print jobs is one (step S1904). If the result of the determination in step S1904 indicates that the number of selected print jobs is one, the job management unit 307 applies a setting change to the one selected job, and executes printing (step S1905). If the result of the determination in step S1904 indicates that there are a plurality of jobs instead of one job, the job management unit 307 sequentially applies a setting change to the plurality of selected jobs, and executes printing (step S1906). Note that, if changed setting values are stored in association with print jobs, the number of selected print jobs is not related to the processing, and thus, it is sufficient that the process in step S1905 is applied to each job to be executed, and it is repeated for the selected print jobs.

With the above-described configuration and processing procedure, when either one print job is selected or a plurality of print jobs are selected, a setting change can be permitted only for a setting item that can be changed in the image forming apparatus 102. Therefore, it is possible to present a situation where setting values of a plurality of setting items are set to inconsistent values due to a setting change made in the image forming apparatus 102. In addition, a setting change that does not cause such inconsistency is allowed. With such a configuration, more flexible printing processing can be performed by improving the operability, and, moreover, the productivity of printing processing can be improved.

Second Embodiment

Differences between the first embodiment and this embodiment are as follows. In this embodiment, the user selects a plurality of print jobs held in the image forming apparatus 102, changes the print settings, and performs printing. At this time, even if the selected print jobs include a print job to which a print setting change cannot be applied, an operation of changing the print settings that cannot be applied is permitted. However, if a plurality of print jobs selected after the print settings have been changed include a print job to which a print setting change cannot be applied, an error message (or a warning message) is displayed. With such a configuration, it is possible to cause the user to realize that the user has made an incorrect change of the print settings, and provide, to the user, an opportunity for changing the settings again before printing is started. Accordingly, it is possible to provide the image forming apparatus 102 that is excellent in the usability. Note that description of this embodiment will be given regarding differences from the first embodiment. Here, processing will be described in which the user selects a plurality of pieces of bibliographic information from the print job list 1000, and changes the print settings.

Figure 20:
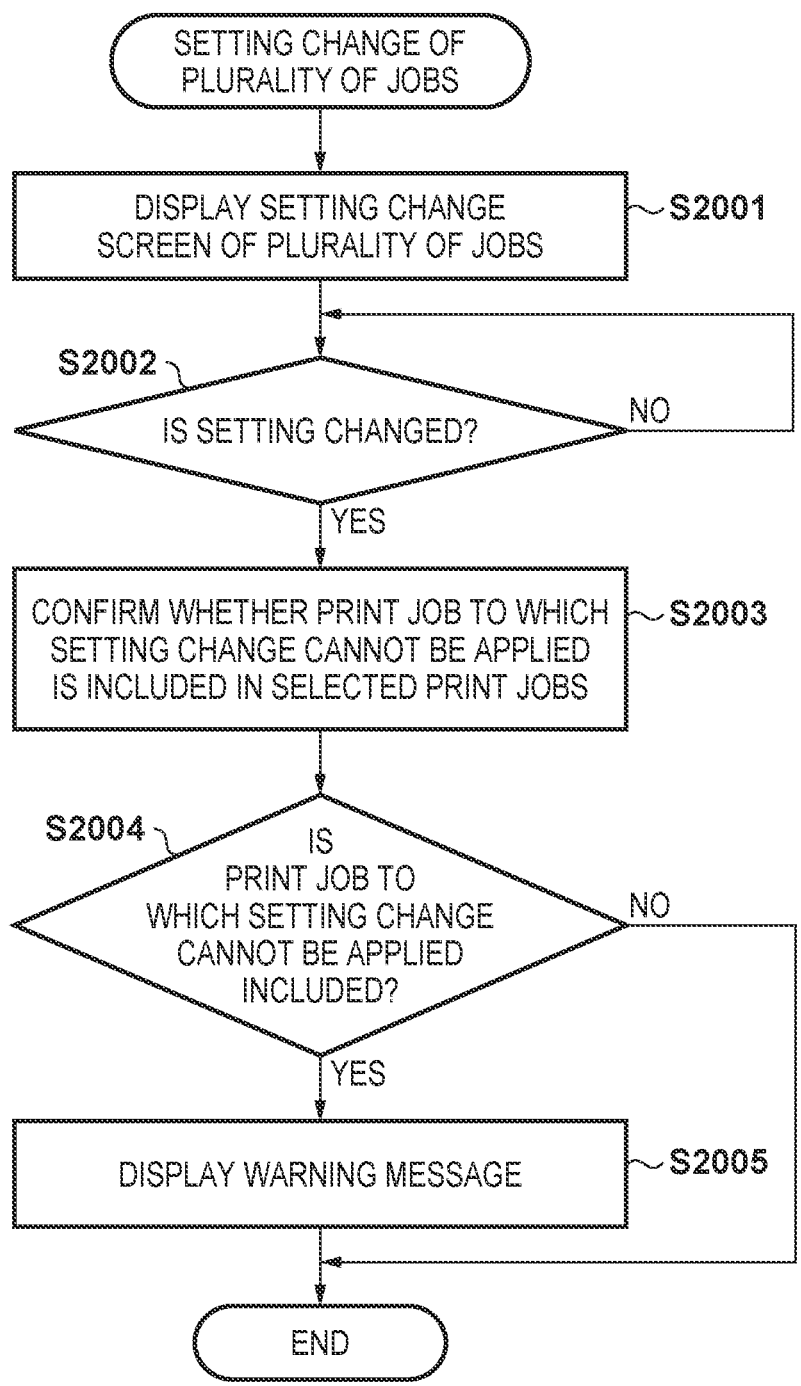
FIG. 20 is a flowchart illustrating processing of a setting change of a plurality of jobs.

FIG. 20 is a flowchart illustrating processing of a setting change of a plurality of jobs in step S1304, in the system software 301, which is executed by the CPU 202 of the image forming apparatus 102. In this embodiment, a description will be given using an example in which the user whose user name is User1 displays the screen of the print job list 1000, selects the print jobs 1017 and 1018 (by checking the checkbox 1005), and presses the print setting button 1011.

Figure 21:
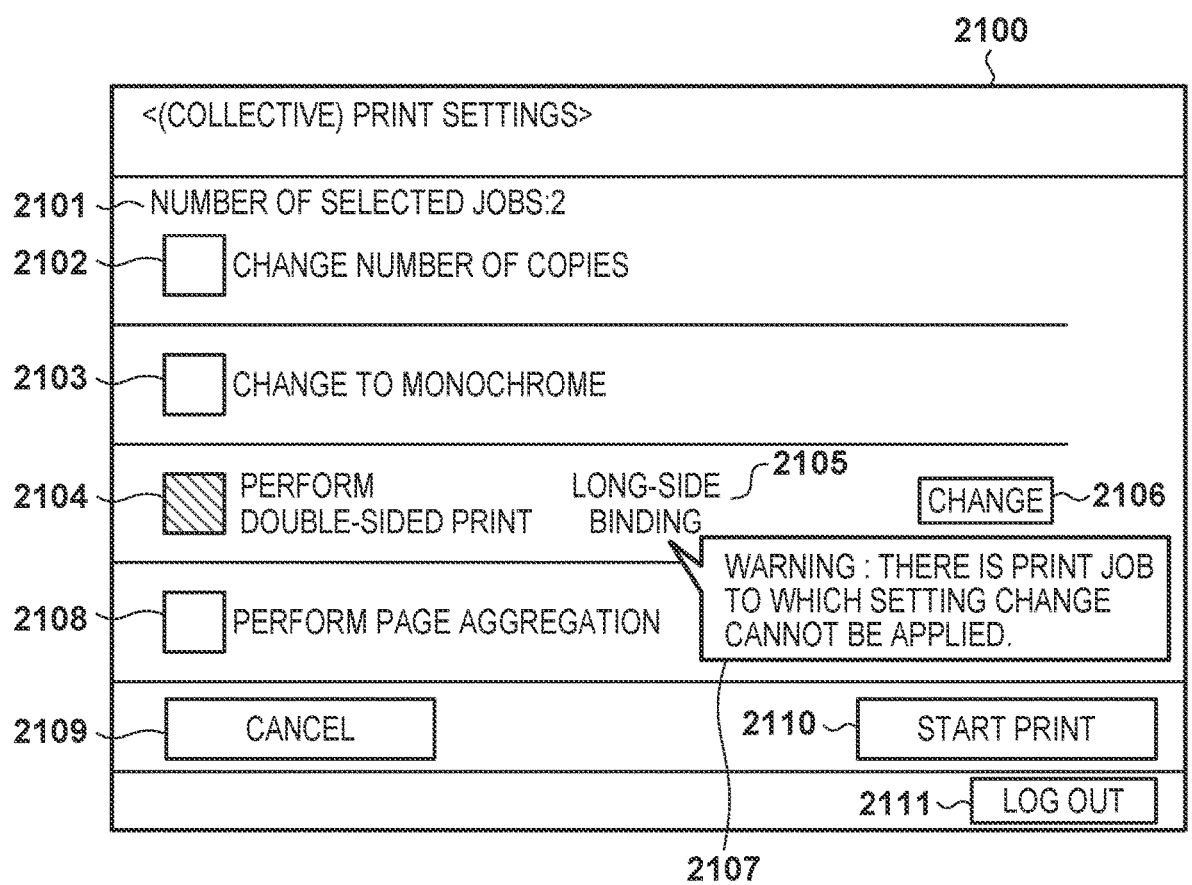
FIG. 21 is a diagram showing a (collective) print setting screen in which a warning message is displayed.

The UI control unit 302 displays a print setting screen 1200 of a plurality of jobs, on the operation unit 207 (step S2001). When the print setting screen is displayed, control related to the change buttons 1202 to 1205 is not performed, and thus all of the change buttons are displayed. After step S2001, the UI control unit 302 waits until the user carries out a setting change operation (step S2002). For example, if the user presses the button 1204 for performing double-sided print, and performs an operation on a setting change screen of double-sided print (not illustrated) so as to change "double-sided print" to "long-side binding", the procedure advances to step S2003. The UI control unit 302 confirms whether or not print jobs selected from the print job list 1000 (the print jobs 1017 and 1018) include a print job to which a setting change of double-sided print cannot be applied (step S2003). The confirmation in step S2003 is carried out based on the change determination list 1501 shown in FIGS. 15A and 15B. This may be performed in the same manner as that in FIG. 17. A setting change of double-sided print can be made regarding the print job 1017. However, the print job 1018 has undergone bookbinding imposition, and thus it is confirmed that a setting change cannot be made for the determination result 1505. In other words, it is confirmed in step S2003 that a print job to which a setting change cannot be applied is included (the print job 1018). As a result of confirmation in step S2003, the UI control unit 302 determines whether or not a print job to which a setting change cannot be applied is included (step S2004). If the result of determination in step S2004 indicates that a print job to which a setting change cannot be applied is included, the UI control unit 302 displays a warning message (step S2005). If the result of the determination in step S2004 indicates that a print job to which a setting change cannot be applied is not included, the UI control unit 302 performs no processing. Here, regarding the settings of double-sided print, it is determined in step S2004 that a print job to which a setting change cannot be applied is included, and thus a warning message is displayed in the process in step S2005. FIG. 21 shows an example of the (collective) print setting screen in which a warning message is displayed. A change button 2104 for double-sided print is displayed in a selected state since a setting change has been carried out. Reference numeral 2107 denotes a warning message.

in the case of a print job for which a setting change can be made, the setting value of the setting item changed in this manner is stored in association with the print job, for example. On the other hand, regarding a print job for which it is determined that a setting change cannot be made, the setting value does not need to be stored. Therefore, in this case, although it is intended that a collective setting change was made, this change is not reflected on a print job for which it is determined that a setting change cannot be made. Therefore, using the warning message in screen display in FIG. 21, the user can be notified that there is a print job on which a setting change is not reflected. A mere warning is displayed in FIG. 21, but information for specifying a print job on which a setting change is not reflected, such as a job name or a job ID may be displayed.

Accordingly, in step S2004, a determination is made as to whether or not selected print jobs include a print job to which a setting change cannot be applied, and if such a print job is included, a warning message 2107 is displayed in step S2005. With these processes, it is possible to cause the user to realize that the user has made an incorrect change of the print settings, and provide, to the user, an opportunity for changing the settings again before printing is started. Accordingly, it is possible to provide the image forming apparatus 102 that is excellent in the usability. Note that, if the changed print setting value is not stored in association with a print job for which it was determined that a setting change cannot be made, the procedure of printing may be the procedure in FIG. 19. This is because print settings originally associated with the print job is applied to the setting item that is not associated with the changed setting value.

However, even if selected print jobs include a print job to which a changed setting value cannot be applied, there can be cases where the changed setting value is stored in association with the print job (or the changed setting value is not associated with the print job). In that case, printing needs to be executed in the procedure in FIG. 22.

Printing Processing (2)

Here, processing will be described in which the user presses a print start 2110 button in a (collective) print setting screen 2100 so as to perform printing.

Figure 22:
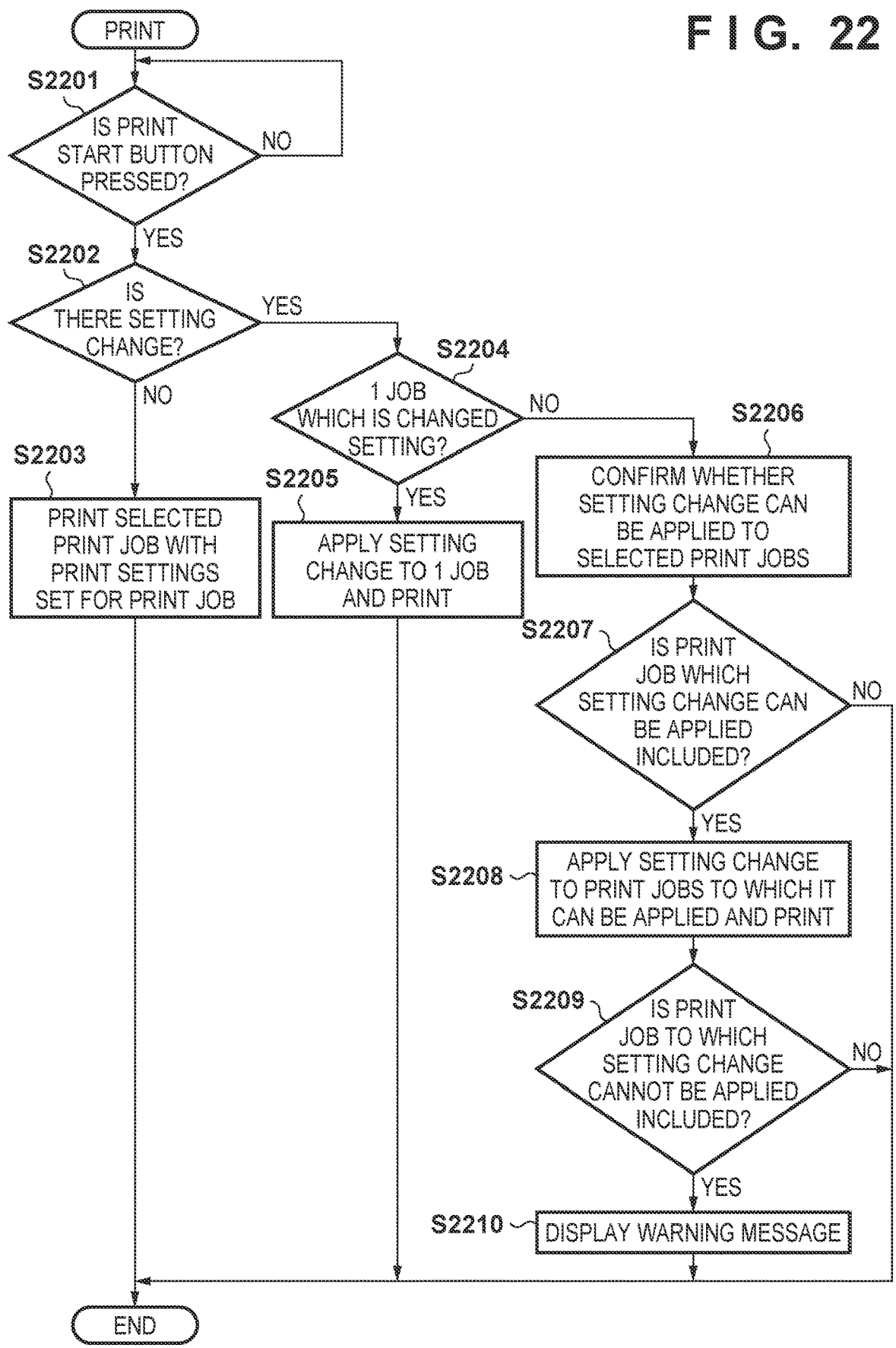
FIG. 22 is a flowchart illustrating processing for performing printing after changing print settings of one or more hold print jobs.
Figure 23:
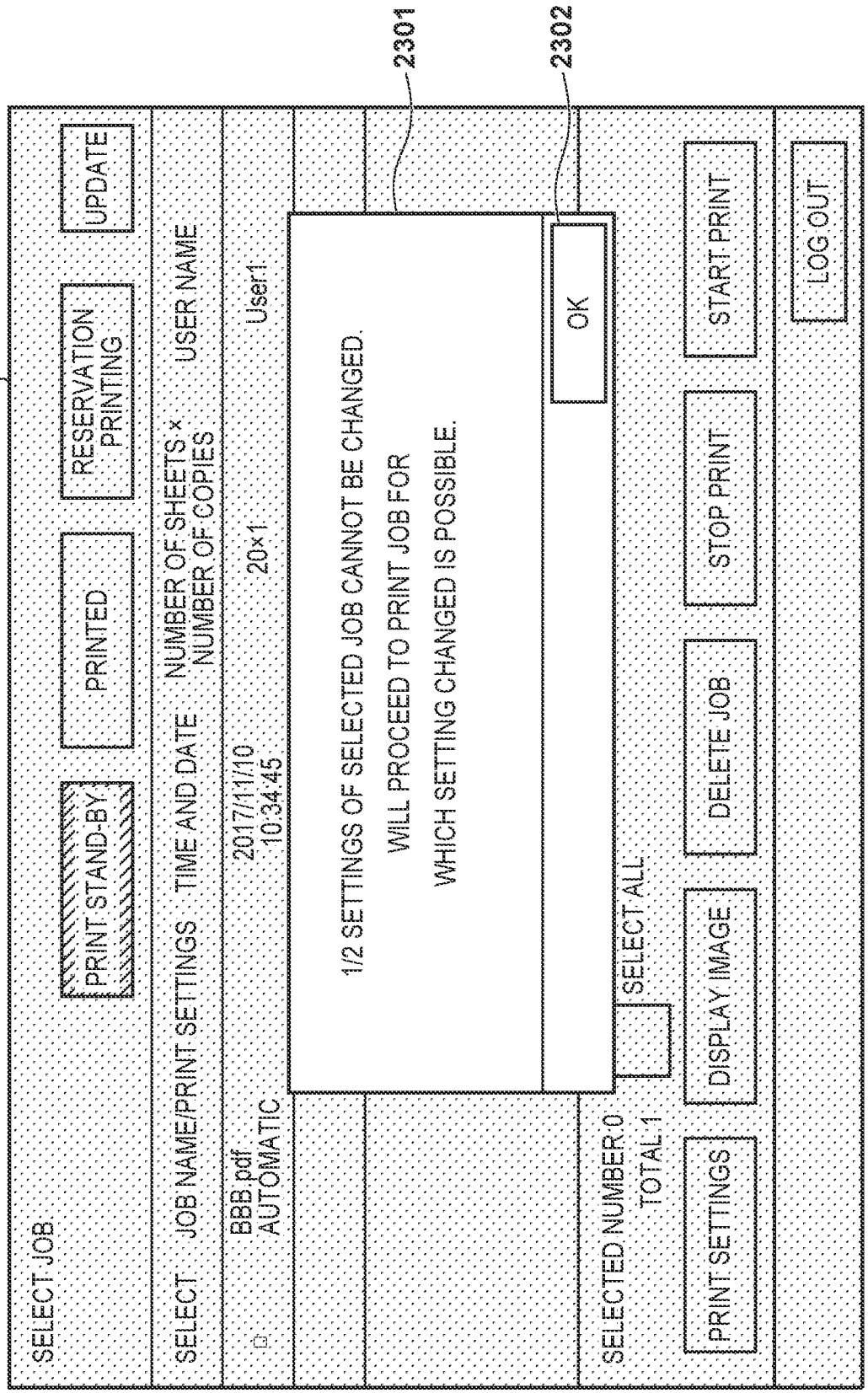
FIG. 23 is a diagram showing an example of a print job list in which a warning message is displayed.

FIG. 22 is a flowchart illustrating processing for performing printing after the print settings of one or more hold print jobs have been changed, in the system software 301, which is executed by the CPU 202 of the image forming apparatus 102. The user starts printing processing by pressing the print start button 2110. Note that the contents of steps S2201 to S2205 are the same as those of steps S1901 to S1905, and thus a description thereof is omitted. If a result of determination in step S2204 indicates that there are a plurality of jobs, not one job, the job management unit 307 confirms whether or not a setting change can be applied to the selected print jobs (step S2206). As the result of the confirmation in step S2206, a job control unit 307 determines whether or not the selected print jobs include a print job to which a setting change can be applied (step S2207). If the result of the determination in step S2207 indicates that one or more print jobs to which a setting change can be applied are included, the job management unit 307 sequentially applies a setting change only to the print jobs to which a setting change can be applied, and executes printing (step S2208). Next, the job management unit 307 determines whether or not the selected print jobs include a print job to which a setting change cannot be applied (step S2209). If the result of the determination in step S2209 indicates that a print job to which a setting change cannot be applied is included, the UI control unit 302 displays a warning message (step S2210). FIG. 23 shows an example of a print job list 2300 in which a warning message is displayed. Reference numeral 2301 denotes a warning message. Reference numeral 2302 denotes an OK button, and, if it is pressed, the warning message can be closed.

Accordingly, in step S2207, a determination is made as to whether or not the selected print jobs include a print job to which a setting change can be applied, and if such a print job is included, printing of only the print job to which a setting change can be applied is carried out, in step S2208. In addition, in step S2209, a determination is made as to whether or not the selected print jobs include a print job to which a setting change cannot be applied, and if such a print job is included, a warning message 2301 is displayed in step S2210. With these processes, it is possible to cause the user to realize that the user has made an incorrect change of the print settings. Also, it is possible to print only a print job to which a setting change can be applied. Accordingly, it is possible to provide the image forming apparatus 102 that is excellent in the usability.

In addition, as long as an effect similar to that of the present disclosure is obtained, an embodiment is not limited to the embodiment described in this embodiment. For example, in this embodiment, a print job to which a setting change cannot be applied is not printed in step S2207, but a configuration is adopted in which the print settings when the print job was entered is applied and printing is performed.

In addition, the user (manager) may select in advance whether the first embodiment or the second embodiment is adopted to perform an operation, using separately provided user mode setting, or the like.

In addition, whether the first embodiment or the second embodiment is adopted to perform an operation may be automatically switched according to the number of print jobs to which a setting change cannot be applied. For example, if the number of print jobs for which a setting change cannot be made is small, the second embodiment is applied. This is based on a viewpoint of performing control so as to print as many jobs as possible, since setting change can be applied to most of the print jobs. In addition, for example, if the number of print jobs to which a setting change can be applied is large, the first embodiment is applied. This is based on a viewpoint of performing control so as to prevent printing processing from being started with an incorrect setting change, since most of the print jobs cannot be printed.

In addition, in the above embodiment, specific print setting items are target items to be changed in the image forming apparatus 102, but all of the illustrated items do not need to be target items, and another setting item may be additionally included.

Variation

In the above embodiment, a case has been illustrated in which reception of a print start button 1235 illustrated in FIG. 12B being selected triggers application of a change and start of printing, but there is no limitation thereto. For example, a change button for collectively changing the print settings and a print start button may be separately provided. In this case, when pressing of change button is detected, the image forming apparatus may attempt collective change of print settings.

In addition, in the above embodiment, an image forming apparatus that includes a print engine has been illustrated an example of a printing control apparatus, but there is no limitation thereto. For example, the present disclosure can be applied to print setting control in a print controller that generates raster data based on printing data, and transmits the raster data to image forming apparatus.

Furthermore, the present disclosure can be applied to a print controller that performs output setting control of a three-dimension (3D) object, and an output setting control of a 3D printer that outputs a three-dimensional shape, and the like. In this case, the image forming apparatus includes a 3D printer that forms a solid object by a: Fused Deposition Modeling (FDM) represented by Stereo lithography (STL), in place of the printer 211 that prints images onto sheets. An example of collective setting in this case will be illustrated. For example, setting of a pitch width of lamination layers and the like can be performed on a plurality of 3D print jobs as collective print setting. On the other hand, depending on the type of layer material that is used by 3D printing data, the pitch width may be limited. In this case, it may be configured to prohibit a collective setting change of a pitch width, or give a notification that there is a 3D print job to which the pitch width specified by the user cannot be applied according to the type of layer material used in the print job, or the like.

Other Embodiments

Embodiment(s) of the present disclosure can also be realized by a computer of a system or apparatus that reads out and executes computer executable instructions (e.g., one or more programs) stored on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034740, filed Feb. 27, 2019, which is hereby incorporated by reference herein in its entirety.

What is claimed is:

1. A printing apparatus comprising:
one or more memories; and
one or more processors that execute a set of instructions to:
receive a print job including at least print settings from an external apparatus;
store a plurality of received print jobs in a storage device;
receive selection of a stored print job as a target of printing from a user; and
receive a change of a print setting of the selected print job from a user,
wherein, when selection of a plurality of stored print jobs is received, and if at least one of the plurality of selected print jobs includes a print setting that is forbidden to be changed, a display is controlled to indicate not to change a value of the print setting.

2. The printing apparatus according to claim 1, wherein the print setting that is forbidden to be changed is displayed on an operation device of the printing apparatus so as not to select an item of the print setting and not to change the value of the print setting.

3. The printing apparatus according to claim 1, wherein, when a user changes a print setting that is forbidden to be changed, a warning message is displayed on an operation device of the printing apparatus.

4. The printing apparatus according to claim 1, wherein, on an operation device of the printing apparatus, a display item for receiving a change regarding of a print setting that is allowed to be changed is displayed, and a display item for changing the print setting that is forbidden to be changed is not displayed.

5. The printing apparatus according to claim 1, wherein the instructions further cause the printing apparatus to change a print setting of the selected print job based on a setting value received from a user.

6. The printing apparatus according to claim 1, wherein the instructions further cause the printing apparatus to print an image onto a sheet based on a print job.

7. The printing apparatus according to claim 1, wherein the print job is a print job for outputting a three-dimensional shape from a 3D printer, and wherein the instructions further cause the printing apparatus to output a three-dimensional shape.

8. The printing apparatus according to claim 1, wherein if at least one of the plurality of selected print jobs includes a setting of bookbinding, the display is controlled to indicate not to change the setting of bookbinding.

9. The printing apparatus according to claim 1, wherein if layout other than 1-in-1 layout has been set on at least one of the plurality of selected print jobs, the display controlled to indicate not to change the setting of page aggregation.

10. A control method for a printing apparatus, the control method comprising:
receiving a print job including at least print settings from an external apparatus;
storing a plurality of received print jobs in a storage device;

receiving selection of a stored print job as a target of printing from a user; and receiving a change of a print setting of the selected print job from a user, wherein, when selection of a plurality of stored print jobs is received, and if at least one of the plurality of selected print jobs includes a print setting that is forbidden to be changed, a display is controlled to indicate not to change a value of the print setting.

11. A non-transitory computer readable storage medium on which is stored a computer program for making a computer execute a control method for a printing apparatus, the control method comprising:

receiving a print job including at least print settings from an external apparatus, storing a plurality of received print jobs in a storage device, receiving selection of a stored print job as a target of printing from a user; and receiving a change of a print setting of the selected print job from a user, wherein, when selection of a plurality of stored print jobs is received, and if at least one of the plurality of selected print jobs includes a print setting that is forbidden to be changed, a display is controlled to indicate not to change value of the print setting.

* * * * *